US012327523B2

(12) United States Patent
Sun et al.

(10) Patent No.: US 12,327,523 B2
(45) Date of Patent: Jun. 10, 2025

(54) PIXEL CIRCUIT AND METHOD FOR DRIVING SAME, DISPLAY PANEL, AND DISPLAY DEVICE

(71) Applicants: Beijing BOE Technology Development Co., Ltd., Beijing (CN); BOE Technology Group Co., Ltd., Beijing (CN)

(72) Inventors: Tuo Sun, Beijing (CN); Xuliang Zhao, Beijing (CN); Libin Liu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/577,653

(22) PCT Filed: Apr. 18, 2023

(86) PCT No.: PCT/CN2023/088842
§ 371 (c)(1),
(2) Date: Jan. 8, 2024

(87) PCT Pub. No.: WO2024/216483
PCT Pub. Date: Oct. 24, 2024

(65) Prior Publication Data
US 2025/0124862 A1 Apr. 17, 2025

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
None
See application file for complete search history.

(56) References Cited

U.S. PATENT DOCUMENTS

2011/0090202 A1* 4/2011 Han ..................... G09G 3/3233 345/76
2011/0141000 A1* 6/2011 Han ..................... G09G 3/3233 345/82
(Continued)

FOREIGN PATENT DOCUMENTS

CN 113053281 A * 6/2021 ............... G09G 3/20
CN 113674695 A * 11/2021
(Continued)

*Primary Examiner* — Dorothy Harris
(74) *Attorney, Agent, or Firm* — IPro, PLLC

(57) ABSTRACT

Provided is a pixel circuit. In the pixel circuit, a data writing circuit controls the connection or disconnection between a data terminal and a first node, a reset circuit controls the connection or disconnection between an initial power supply terminal and a second node and between an initial power supply terminal and a light-emitting element, and controls the connection or disconnection between a reference power supply terminal and the first node, a potential adjustment circuit adjusts the potentials of the first node, the second node and the third node, a light emission control circuit controls the connection or disconnection between the reference power supply terminal and the first node, and controls the connection or disconnection between the fourth node and the light-emitting element, and a drive circuit drives the light-emitting element to emit light.

20 Claims, 10 Drawing Sheets

(52) U.S. Cl.
CPC . *G09G 2300/0861* (2013.01); *G09G 2310/08* (2013.01); *G09G 2340/0435* (2013.01)

(56) References Cited

U.S. PATENT DOCUMENTS

| | | | | |
|---|---|---|---|---|
| 2011/0193856 | A1* | 8/2011 | Han | G09G 3/3233 345/76 |
| 2021/0174743 | A1* | 6/2021 | Chang | G09G 3/3258 |
| 2023/0154402 | A1* | 5/2023 | Zheng | H10K 59/131 345/206 |

FOREIGN PATENT DOCUMENTS

| | | | | | |
|---|---|---|---|---|---|
| CN | 115662355 | A | * | 1/2023 | |
| WO | WO-2022160125 | A1 | * | 8/2022 | G09G 3/3233 |

* cited by examiner

PIXEL CIRCUIT AND METHOD FOR DRIVING SAME, DISPLAY PANEL, AND DISPLAY DEVICE

CROSS-REFERENCE TO RELATED APPLICATIONS

This application is a U.S. national stage of international application No. PCT/CN2023/088842, filed on Apr. 18, 2023, the disclosure of which is herein incorporated by reference in its entirety.

TECHNICAL FIELD

The present disclosure relates to the field of display technologies, and in particular, to a pixel circuit and a method for driving the same, a display panel, and a display device.

BACKGROUND

A display panel generally includes a substrate and a plurality of pixels disposed on the substrate. Each pixel includes a pixel circuit and a light-emitting element. The pixel circuit is coupled to the light-emitting element and configured to drive the light-emitting element to emit light.

SUMMARY

A pixel circuit and a method for driving the same, a display panel, and a display device are provided. The technical solutions are as follows.

In an aspect, a pixel circuit is provided. The pixel circuit includes:

- a data writing circuit, coupled to a gate signal terminal, a data terminal and a first node, and configured to control connection or disconnection between the data terminal and the first node based on a gate driving signal provided by the gate signal terminal;
- a reset circuit, coupled to a reset signal terminal, a scanning signal terminal, a first reference power supply terminal, a first initial power supply terminal, a second initial power supply terminal, the first node, a second node and a light-emitting element, and configured to control connection or disconnection between the first initial power supply terminal and the second node based on a reset signal provided by the reset signal terminal, and control connection or disconnection between the first reference power supply terminal and the first node and connection or disconnection between the second initial power supply terminal and the light-emitting element based on a scanning signal provided by the scanning signal terminal;
- a potential adjustment circuit, coupled to a first compensation terminal, a second compensation terminal, a driving power supply terminal, the first node, the second node, a third node and a fourth node, and configured to control connection or disconnection between the driving power supply terminal and the third node based on a first compensation signal provided by the first compensation terminal, control connection or disconnection between the second node and the fourth node based on a second compensation signal provided by the second compensation terminal, and adjust a potential of the first node, a potential of the second node and a potential of the third node through a coupling effect;

- a light emission control circuit, coupled to a light emission control terminal, a second reference power supply terminal, the first node, the fourth node and the light-emitting element, and configured to control connection or disconnection between the second reference power supply terminal and the first node and connection or disconnection between the fourth node and the light-emitting element based on a light emission control signal provided by the light emission control terminal, wherein a potential of a second reference power supply signal provided by the second reference power supply terminal is lower than a potential of a first reference power supply signal provided by the first reference power supply terminal; and
- a drive circuit, coupled to the second node, the driving power supply terminal and the fourth node, and configured to transmit a driving signal to the fourth node based on the potential of the second node and the driving power supply signal.

In some embodiments, the reset circuit includes:

- a first reset sub-circuit, coupled to the reset signal terminal, the first initial power supply terminal and the second node, and configured to control the connection or disconnection between the first initial power supply terminal and the second node based on the reset signal;
- a second reset sub-circuit, coupled to the scanning signal terminal, the first reference power supply terminal and the first node, and configured to control the connection or disconnection between the first reference power supply terminal and the first node based on the scanning signal; and
- a third reset sub-circuit, coupled to the scanning signal terminal, the second initial power supply terminal and the light-emitting element, and configured to control the connection or disconnection between the second initial power supply terminal and the light-emitting element based on the scanning signal.

In some embodiments, the first reset sub-circuit includes: a first transistor; the second reset sub-circuit includes: a second transistor; and the third reset sub-circuit includes: a third transistor; wherein

- a gate of the first transistor is coupled to the reset signal terminal, a first electrode of the first transistor is coupled to the first initial power supply terminal, and a second electrode of the first transistor is coupled to the second node;
- a gate of the second transistor is coupled to the scanning signal terminal, a first electrode of the second transistor is coupled to the first reference power supply terminal, and a second electrode of the second transistor is coupled to the first node;
- a gate of the third transistor is coupled to the scanning signal terminal, a first electrode of the third transistor is coupled to the second initial power supply terminal, and a second electrode of the third transistor is coupled to the light-emitting element.

In some embodiments, the potential adjustment circuit includes:

- a switching sub-circuit, coupled to the first compensation terminal, the driving power supply terminal and the third node, and configured to control the connection or disconnection between the driving power supply terminal and the third node based on the first compensation signal;
- a compensation sub-circuit, coupled to the second compensation terminal, the second node and the fourth node, and configured to control the connection or disconnection between the second node and the fourth node based on the second compensation signal; and an adjustment sub-circuit, coupled to the first node, the second node and the third node, and configured to adjust the potential of the first node, the potential of the second node and the potential of the third node through the coupling effect.

In some embodiments, the switching sub-circuit includes: a fourth transistor; the compensation sub-circuit includes: a fifth transistor; and the adjustment sub-circuit includes: a first capacitor and a second capacitor; wherein a gate of the fourth transistor is coupled to the first compensation terminal, a first electrode of the fourth transistor is coupled to the driving power supply terminal, and a second electrode of the fourth transistor is coupled to the third node;

a gate of the fifth transistor is coupled to the second compensation terminal, a first electrode of the fifth transistor is coupled to the fourth node, and a second electrode of the fifth transistor is coupled to the second node;

the first capacitor is connected in series between the first node and the third node; and the second capacitor is connected in series between the third node and the second node.

In some embodiments, the light emission control circuit includes:

a first light emission control sub-circuit, coupled to the light emission control terminal, the second reference power supply terminal and the first node, and configured to control the connection or disconnection between the second reference power supply terminal and the first node based on the light emission control signal; and a second light emission control sub-circuit, coupled to the light emission control terminal, the fourth node and the light-emitting element, and configured to control the connection or disconnection between the fourth node and the light-emitting element based on the light emission control signal.

In some embodiments, the first light emission control sub-circuit includes: a sixth transistor; and the second light emission control sub-circuit includes: a seventh transistor; wherein a gate of the sixth transistor is coupled to the light emission control terminal, a first electrode of the sixth transistor is coupled to the second reference power supply terminal, and a second electrode of the sixth transistor is coupled to the first node; and a gate of the seventh transistor is coupled to the light emission control terminal, a first electrode of the seventh transistor is coupled to the fourth node, and a second electrode of the seventh transistor is coupled to the light-emitting element.

In some embodiments, the pixel circuit further includes:

an anti-leakage circuit, coupled to the first compensation terminal, the second node and a fifth node, and configured to control connection or disconnection between the second node and the fifth node based on the first compensation signal;

wherein the potential adjustment circuit is further coupled to the fifth node, and the drive circuit is coupled to the second node through the fifth node.

In some embodiments, the anti-leakage circuit includes: an eighth transistor; wherein a gate of the eighth transistor is coupled to the first compensation terminal, a first electrode of the eighth transistor is coupled to the fifth node, and a second electrode of the eighth transistor is coupled to the second node.

In some embodiments, a material of a transistor controlling the connection or disconnection between the first initial power supply terminal and the second node in the reset circuit and a material of a transistor controlling the connection or disconnection between the fourth node and the second node in the potential adjustment circuit both include: a low temperature poly-silicon material; and a material of a transistor in the anti-leakage circuit includes: an oxide material.

In some embodiments, the data writing circuit includes: a ninth transistor; and the drive circuit includes: a tenth transistor; wherein a gate of the ninth transistor is coupled to the gate signal terminal, a first electrode of the ninth transistor is coupled to the date terminal, and a second electrode of the ninth transistor is coupled to the first node; and a gate of the tenth transistor is coupled to the second node, a first electrode of the tenth transistor is coupled to the driving power supply terminal, and a second electrode of the tenth transistor is coupled to the fourth node.

In another aspect, a method for driving a pixel circuit is provided. The method is applicable to the pixel circuit described in the above aspect. The method includes:

in a first stage, controlling a first initial power supply terminal to be connected to the second node by a reset circuit based on a reset signal provided by a reset signal terminal, controlling a first reference power supply terminal to be connected to a first node and controlling a second initial power supply terminal to be connected to a light-emitting element by the reset circuit based on a scanning signal provided by a scanning signal terminal, and controlling a driving power supply terminal to be connected to a third node by a potential adjustment circuit based on a first compensation signal provided by a first compensation terminal;

in a second stage, controlling the first reference power supply terminal to be connected to the first node and controlling the second initial power supply terminal to be connected to the light-emitting element by the reset circuit based on the scanning signal, controlling the driving power supply terminal to be connected to the third node by the potential adjustment circuit based on the first compensation signal, and controlling the second node to be connected to a fourth node by the potential adjustment circuit based on a second compensation signal provided by a second compensation terminal;

in a third stage, controlling a data terminal to be connected to the first node by a data writing circuit based on a gate driving signal provided by a gate signal terminal, controlling the driving power supply terminal to be connected to the third node by the potential adjustment circuit based on the first compensation signal, and controlling the second node to be connected to the fourth node by the potential adjustment circuit based on the second compensation signal;

in a fourth stage, controlling a second reference power supply terminal to be connected to the first node and controlling the fourth node to be connected to the light-emitting element by a light emission control circuit based on a light emission control signal provided by a light emission control terminal, and transmitting a driving signal to the fourth node by a drive circuit based on a potential of the second node and a driving power supply signal provided by the driving power supply terminal, to drive the light-emitting element to emit light; and in a fifth stage, controlling the first reference power supply terminal to be connected to the first node and controlling the second initial power supply terminal to be connected to the light-emitting element by the reset circuit on based on the scanning signal;

wherein a potential of a second reference power supply signal provided by the second reference power supply terminal is lower than a potential of a first reference power supply signal provided by the first reference power supply terminal; and the first stage, the second stage, the third stage, the fourth stage, and the fifth stage are sequentially executed; and in each stage, the potential adjustment circuit adjusts a potential of the first node, the potential of the second node and a potential of the third node through a coupling effect.

In some embodiments, the pixel circuit further includes: an anti-leakage circuit; and the method further includes: controlling the second node to be connected to a fifth node by the anti-leakage circuit based on the first compensation signal in the first stage to the third stage; wherein the potential adjustment circuit is further coupled to the fifth node, and the drive circuit is coupled to the second node through the fifth node.

In still another aspect, a display panel is provided. The display panel includes a substrate, and a plurality of pixels disposed on a side of the substrate; wherein each of the pixels includes a light-emitting element, and the pixel circuit described in the above aspect. The pixel circuit is coupled to the light-emitting element and configured to drive the light-emitting element to emit light.

In still another aspect, a display device is provided. The display device includes: a signal supply circuit, and the display panel described in the above aspect; wherein the signal supply circuit is coupled to a plurality of signal terminals coupled to the pixel circuits in the display panel, and is configured to supply signals to the plurality of signal terminals to control the pixel circuits to drive the coupled light-emitting elements to emit light.

BRIEF DESCRIPTION OF DRAWINGS

For clearer descriptions of the technical solutions in the embodiments of the present disclosure, the accompanying drawings required for describing the embodiments are described below. The accompanying drawings in the following description show merely some embodiments of the present disclosure, and those of ordinary skill in the art may still derive other drawings from these accompanying drawings without creative effort.

DETAILED DESCRIPTION

Figure 1:
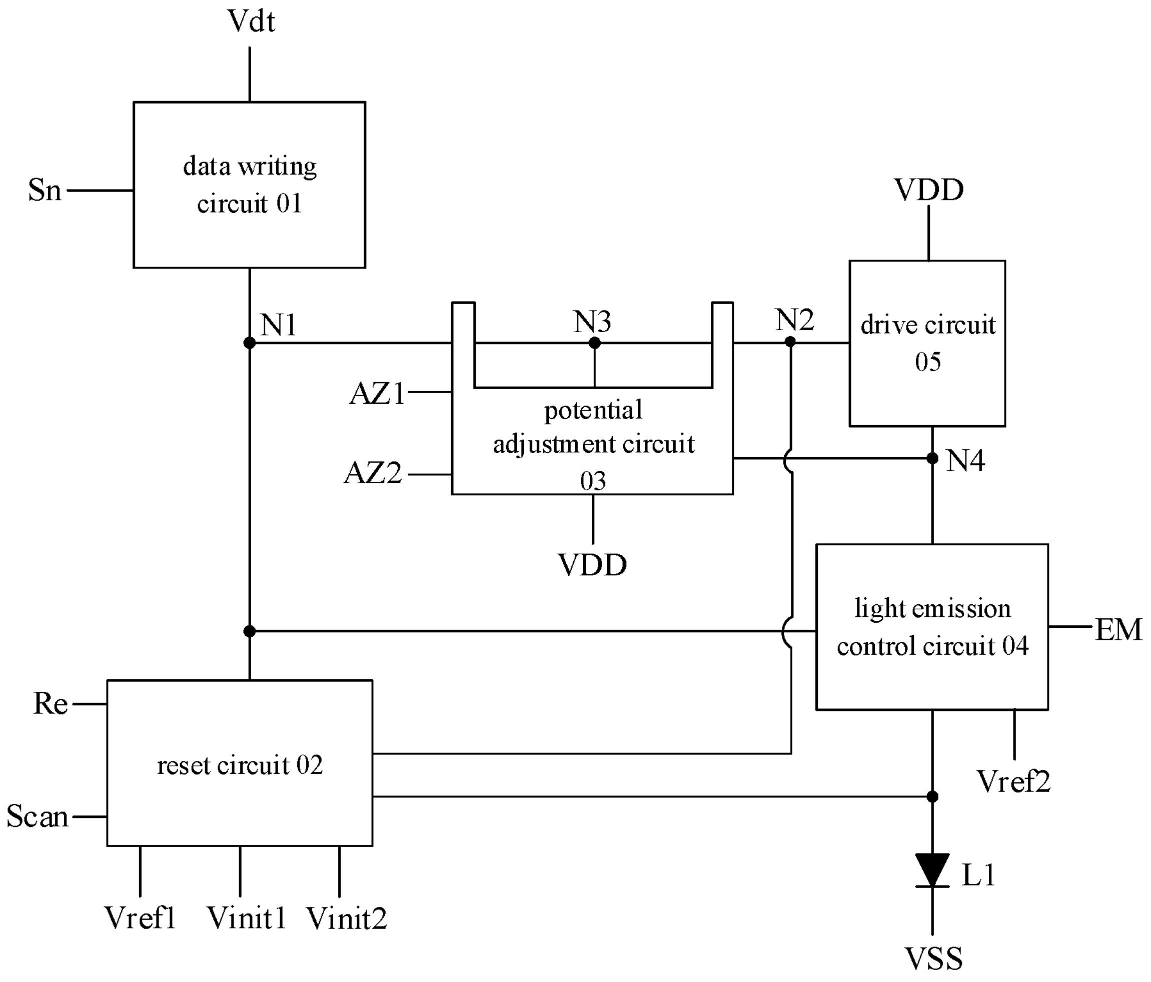
FIG. 1 is a schematic structural diagram of a pixel circuit according to some embodiments of the present disclosure.

To make the objectives, technical solutions, and advantages of the present disclosure clearer, the embodiments of the present disclosure will be further described in detail below with reference to the accompanying drawings.

It should be noted that the transistors used in all the embodiments of the present disclosure are thin film transistors or field-effect transistors or other devices having the same characteristics. The transistors used in the embodiments of the present disclosure are mainly switching transistors according to the functions in the circuit. Since a source and a drain of the switching transistor used here are symmetrical, the source and the drain are interchangeable. In the embodiments of the present disclosure, the source is referred to as a first electrode and the drain is referred to as a second electrode. According to the form in the drawings, an intermediate terminal of the transistor is a control electrode which may also be referred to as a gate, a signal input terminal is a source, and a signal output terminal is a drain. In addition, the switching transistors used in the embodiments of the present disclosure include any one of a P-type switching transistor and an N-type switching transistor. The P-type switching transistor is turned on when the gate is at a low level and is turned off when the gate is at a high level, and the N-type switching transistor is turned on when the gate is at a high level and turned off when the gate is at a low level. In addition, a plurality of signals in the embodiments of the present disclosure each correspond to a first potential and a second potential. The first potential and the second potential only represent that the signal has potentials with two different state quantities, but do not represent that the first potential or the second potential has a specific value in the whole text.

An organic light-emitting diode (OLED) display is one of the hot spots in the field of display research currently. Compared with a liquid crystal display (LCD), the OLED display has the advantages of low power consumption, low cost, self-luminescence, wide viewing angle, fast response speed and the like. A pixel circuit is generally used in an OLED display to drive the OLED to emit light. Moreover, with the development of display technology, the application of OLED display has gradually expanded from the fields such as watches, mobile phones, and tablets with medium and small size to the fields of personal computers (PCs) and monitors with big size. Large-size displays have the feature of a high per pixel inch (PPI), i.e., resolution. In addition, due to the big difference in the scenes where the large-size displays are used, the requirement for the refresh rate varies greatly. For example, in a text reading mode or a power saving mode, the required refresh rate is generally lower than 10 Hertz (Hz); in a web browsing mode, a video watching mod or the like, the required refresh rate is generally from 48 Hz to 60 Hz; and in a game scene, the required refresh rate needs to reach 120 Hz to 144 Hz, even to 240 Hz and higher. Therefore, the displays need to have a good display effect at the refresh rates of several Hz to several hundred Hz.

At present, the common pixel circuits have a 7T1C (i.e., including 7 transistors and 1 capacitors) structure, and data writing and compensation for the threshold voltage Vth are simultaneously completed by the same device in the pixel circuit. As a result, the Vth cannot be reliably compensated in a short time (e.g., a high frame rate). In addition, the influence of the non-uniformity of the characteristics of the driving transistor in the pixel circuit on the data writing is also amplified, resulting in a significant decrease in the display quality of the displays. Therefore, it is urgent to find other compensation methods to improve the accuracy of data writing and reliably compensate the Vth within a brief period, so as to improve the display quality of the displays.

In the related art, the pixel circuit generally includes a light emission control circuit and a light emission drive circuit. The light emission control circuit includes a plurality of control transistors, and the light emission drive circuit includes a driving transistor. The plurality of control transistors are coupled to a plurality of signal terminals (e.g., a gate signal terminal and a data terminal) respectively, and are further coupled to the gate of the driving transistor for controlling the potential of the gate of the driving transistor. A first electrode of the driving transistor is configured to receive a driving power supply signal, and a second electrode of the driving transistor is coupled to the light-emitting element to transmit a driving signal to the light-emitting element based on the potential of the gate and the driving power supply signal, so as to drive the light-emitting element to emit light.

However, due to factors such as processes and materials, the uniformity and stability of the semiconductor characteristics such as the threshold voltage or mobility of the driving transistor are poor. As a result, the driving signal for driving the light-emitting element to emit light cannot be generated reliably, and the display effect of the display panel is poor.

The embodiments of the present disclosure provide a new pixel circuit. The pixel circuit can drive the light-emitting element to emit light by means of data writing and Vth compensation which are separate from each other, and thus the compensation for Vth is no longer limited by the data writing time, and a better compensation effect can be achieved in a short time (e.g., a high resolution and high frame rate). In addition, in the pixel circuit provided in the embodiments of the present disclosure, the potential of the gate of the driving transistor can also be flexibly adjusted, and the driving transistor can be reset in an off state at a low frame rate, thereby ensuring a good display stability at the low frame rate.

FIG. 1 is a schematic structural diagram of a pixel circuit according to some embodiments of the present disclosure. As shown in FIG. 1, the pixel circuit includes a data writing circuit 01, a reset circuit 02, a potential adjustment circuit 03, a light emission control circuit 04, and a drive circuit 05.

The data writing circuit 01 is coupled to a gate signal terminal Sn, a data terminal Vdt, and a first node N1. The data writing circuit 01 is configured to control the connection or disconnection between the data terminal Vdt and the first node N1 based on a gate driving signal provided by the gate signal terminal Sn.

For example, when the potential of the gate driving signal provided by the gate signal terminal Sn is the first potential, the data writing circuit 01 controls the data terminal Vdt to be connected to the first node N1, so that the data signal provided by the data terminal Vdt is transmitted to the first node N1 to charge the first node N1. When the potential of the gate driving signal provided by the gate signal terminal Sn is the second potential, the data writing circuit 01 controls the data terminal Vdt to be disconnected from the first node N1.

Optionally, in the embodiments of the present disclosure, the first potential is an effective potential, the second potential is an ineffective potential, and the first potential is a low potential relative to the second potential. Certainly, in some other embodiments, the first potential is a high potential relative to the second potential.

The reset circuit 02 is coupled to a reset signal terminal Re, a scanning signal terminal Scan, a first reference power supply terminal Vref1, a first initial power supply terminal Vinit1, a second initial power supply terminal Vinit2, the first node N1, a second node N2, and a light-emitting element L1. The reset circuit 02 is configured to control the connection or disconnection between the first initial power supply terminal Vinit1 and the second node N2 based on a reset signal provided by the reset signal terminal Re, and control, based on a scanning signal provided by the scanning signal terminal Scan, the connection or disconnection between the first reference power supply terminal Vref1 and the first node N1 and the connection or disconnection between the second initial power supply terminal Vinit2 and the light-emitting element L1.

For example, when the potential of the reset signal provided by the reset signal terminal Re is the first potential, the reset circuit 02 controls the first initial power supply terminal Vinit1 to be connected to the second node N2, so that the first initial power supply signal provided by the first initial power supply terminal Vinit is transmitted to the second node N2 to reset the second node N2. When the potential of the reset signal provided by the reset signal terminal Re is the second potential, the reset circuit 02 controls the first initial power supply terminal Vinit1 to be disconnected from the second node N2.

Similarly, when the potential of the scanning signal provided by the scanning signal terminal Scan is the first potential, the reset circuit 02 controls the first reference power supply terminal Vref1 to be connected to the first node N1, so that the first reference power supply signal provided by the first reference power supply terminal Vref1 is transmitted to the first node N1 to reset the first node N1; and the reset circuit 02 controls the second initial power supply terminal Vinit2 to be connected to the light-emitting element L1, so that the second initial power supply signal provided by the second initial power supply terminal Vinit2 is transmitted to the light-emitting element L1 to reset the light-emitting element L1. When the potential of the scanning signal provided by the scanning signal terminal Scan is the second potential, the reset circuit 02 controls the first reference power supply terminal Vref1 to be disconnected from the first node N1 and controls the second initial power supply terminal Vinit2 to be disconnected from the light-emitting element L1.

The potential adjustment circuit 03 is coupled to a first compensation terminal AZ1, a second compensation terminal AZ2, a driving power supply terminal VDD, the first node N1, the second node N2, a third node N3, and a fourth node N4. The potential adjustment circuit 03 is configured to control the connection or disconnection between the driving power supply terminal VDD and the third node N3 based on a first compensation signal provided by the first compensation terminal AZ1, control the connection or disconnection between the second node N2 and the fourth node N4 based on a second compensation signal provided by the second compensation terminal AZ2, and adjust the potential of the first node N1, the potential of the second node N2, and the potential of the third node N3 through a coupling effect.

For example, when the potential of the first compensation signal provided by the first compensation terminal AZ1 is the first potential, the potential adjustment circuit 03 controls the driving power supply terminal VDD to be connected to the third node N3, so that the driving power supply signal provided by the driving power supply terminal VDD is transmitted to the third node N3 to charge the third node N3. When the potential of the first compensation signal provided by the first compensation terminal AZ1 is the second potential, the potential adjustment circuit 03 controls the driving power supply terminal VDD to be disconnected from the third node N3.

Similarly, when the potential of the second compensation signal provided by the second compensation terminal AZ2 is the first potential, the potential adjustment circuit 03 controls the second node N2 to be connected to the fourth node N4, so that the potential of the second node N2 and the potential of the fourth node N4 interact with each other, that is, the potential of one of the second node N2 and the fourth node N4 is adjusted based on the potential of the other one of the second node N2 and the fourth node N4. When the potential of the second compensation signal provided by the second compensation terminal AZ2 is the second potential, the potential adjustment circuit 03 controls the second node N2 to be disconnected from the fourth node N4.

The light emission control circuit 04 is coupled to a light emission control terminal EM, a second reference power supply terminal Vref2, the first node N1, the fourth node N4, and the light-emitting element L1. The light emission control circuit 04 is configured to control, based on a light emission control signal provided by the light emission control terminal EM, the connection or disconnection between the second reference power supply terminal Vref2 and the first node N1 and the connection or disconnection between the fourth node N4 and the light-emitting element L1.

For example, when the potential of the light emission control signal provided by the light emission control terminal EM is the first potential, the light emission control circuit 04 controls the second reference power supply terminal Vref2 to be connected to the first node N1, so that the potential of the second reference power supply signal provided by the second reference power supply terminal Vref2 is transmitted to the first node N1 to reset the first node N1; and the light emission control circuit 04 controls the fourth node N4 to be connected to the light-emitting element L1, so that the potential of the fourth node N4 is transmitted to the light-emitting element L1 to drive the light-emitting element L1 to emit light reliably. When the potential of the light emission control signal provided by the light emission control terminal EM is the second potential, the light emission control circuit 04 controls the second reference power supply terminal Vref2 to be disconnected from the first node N1 and controls the fourth node N4 to be disconnected from the light-emitting element L1.

The drive circuit 05 is coupled to the second node N2, the driving power supply terminal VDD, and the fourth node N4. The drive circuit 05 is configured to transmit a driving signal (e.g., a driving current) to the fourth node N4 based on the potential of the second node N2 and the driving power supply signal. When the light emission control circuit 04 controls the fourth node N4 to be connected to the light-emitting element L1, the driving signal transmitted to the fourth node N4 is further transmitted to the light-emitting element L1, thereby driving the light-emitting element L1 to emit light.

In some embodiments, as shown in FIG. 1, the reset circuit 02 and the drive circuit 05 are both coupled to the first electrode of the light-emitting element L1. The second electrode of the light-emitting element L1 is coupled to a pull-down power supply terminal VSS. The light-emitting element L1 emits light under the action of a potential difference between the first electrode and the second electrode. One of the first electrode and the second electrode of the light-emitting element L1 is an anode, and the other electrode of the light-emitting element L1 is a cathode. In the structure shown in FIG. 1, the first electrode of the light-emitting element L1 is the anode, and the second electrode is the cathode.

It can be known from the working principle of each circuit described above that, in the embodiments of the present disclosure, the data writing circuit 01 writes the data signal to the first node N1 based on the gate driving signal, the potential adjustment circuit 03 writes the driving power supply signal to the third node N3 based on the compensation signal to control the connection or disconnection between the second node N2 and the fourth node N4, and the potentials of the first node N1, the second node N2 and the third node N3 are adjusted through the coupling effect. In this way, the threshold voltage Vth of the driving transistor in the drive circuit 05 is reliably written to the second node N2, and thus the driving signal subsequently generated by the drive circuit 05 is irrelevant to the threshold voltage Vth, thereby compensating the threshold voltage Vth. It can be seen from FIG. 1 that in the pixel circuit described in the embodiments of the present disclosure, the circuit for writing data and the circuit for compensating the threshold voltage Vth are independent from each other, that is, data writing and compensation for the threshold voltage Vth are performed by different circuits. On this basis, data writing and compensation for the threshold voltage can be reliably separated by flexibly setting the signals provided by the signal terminals. Thus, the compensation time for the threshold voltage Vth is no longer limited by the data writing time, and a better compensation effect can be achieved in a short time, thereby ensuring a good display effect.

In addition, in the embodiments of the present disclosure, the potential of the second reference power supply signal provided by the second reference power supply terminal Vref2 is lower than the potential of the first reference power supply signal provided by the first reference power supply terminal Vref1.

For example, the potential Vref10 of the first reference power supply signal is about 5 volts (V) to 7V; and the potential Vref20 of the second reference power supply signal is about 2V to 4V.

It should be noted that during the display process, the light-emitting element L1 and the driving transistor included in the drive circuit 05 need to be reset at a higher frequency, so as to compensate for the luminance difference caused by aging of the device during the light-emitting process of the light-emitting element L1. The reset action also needs to be performed at the low frame rate. Correspondingly, the refresh of one frame of picture is generally divided into a refresh frame stage and a hold frame stage that are sequentially executed. In the refresh frame stage, the data signal is written, and compensation for the threshold voltage Vth, driving the light-emitting element L1 to emit light, and the like may also be performed; and in the hold frame stage, only the light-emitting element L1 and the driving transistor are reset.

In this way, on the basis of setting the potential Vref10 of the first reference power supply signal provided by the first reference power supply terminal Vref1 higher than the potential Vref20 of the second reference power supply signal provided by the second reference power supply terminal Vref2, in the hold frame stage, the potential of the light emission control signal provided by the light emission control terminal EM is set high (i.e., the potential of the light emission control signal is controlled to be the ineffective potential) and the potential of the scanning signal provided by the scanning signal terminal Scan is set low (i.e., the potential of the scanning signal is controlled to be the effective potential), such that the light emission control circuit 04 controls the fourth node N4 to be disconnected from the light-emitting element L1 and controls the second reference power supply terminal Vref2 to be disconnected from the first node N1, and the reset circuit 02 controls the first reference power supply terminal Vref1 to be connected to the first node N1 and controls the second initial power supply terminal Vinit2 to be connected to the light-emitting element L1. Thus, in the first reference power supply terminal Vref1 and the second reference power supply terminal Vref2, the first reference power supply terminal Vref1 providing a sufficiently high potential can transmit the first reference power supply signal Vref10 to the first node N1, and then the potential of the second node N2 is pulled up under the regulating effect of the potential adjustment circuit 03, thereby ensuring that the driving transistor can be reliably turned off, and the driving transistor is reset in an off state. In addition, the second initial power supply terminal Vinit2 can transmit the second initial power supply signal to the light-emitting element L1, to reliably reset the light-emitting element L1. This control method can ensure a good display stability of the light-emitting element at the low frame rate.

Then, when the light-emitting element L1 needs to emit light normally, the potential of the light emission control signal provided by the light emission control terminal EM is set low (i.e., the potential of the light emission control signal is controlled to be the effective potential) and the potential of the scanning signal provided by the scanning signal terminal Scan is set high (i.e., the potential of the scanning signal is controlled to be the ineffective potential), such that the light emission control circuit 04 controls the second reference power supply terminal Vref2 to be connected to the first node N1 and controls the fourth node N4 to be connected to the light-emitting element L1, and the reset circuit 02 controls the first reference power supply terminal Vref1 to be disconnected from the first node N1 and controls the second initial power supply terminal Vinit2 to be disconnected from the light-emitting element L1. Thus, in the first reference power supply terminal Vref1 and the second reference power supply terminal Vref2, the second reference power supply terminal Vref2 providing a lower potential can transmit the second reference power supply signal to the first node N1, that is, the potential of the first node N1 returns to the potential Vref20 of the second reference power supply signal. In addition, since only the potential of the first node N1 changes, according to the law of conservation of charge, the potential of the second node N2 can quickly return to the potential which enables normal light emission of the light-emitting element L1 under the control of the potential adjustment circuit 03, thereby ensuring that the drive circuit 05 reliably drives the light-emitting element L1 to emit light based on the potential of the second node N2.

In summary, the embodiments of the present disclosure provide a pixel circuit. In the pixel circuit, the data writing circuit controls the connection or disconnection between the data terminal and the first node based on the gate driving signal; the reset circuit controls, based on the reset signal and the scanning signal, the connection or disconnection between the initial power supply terminal and the second node and between the initial power supply terminal and the light-emitting element, and the connection or disconnection between the reference power supply terminal and the first node; the potential adjustment circuit controls, based on the compensation signal, the connection or disconnection between the driving power supply terminal and the third node and the connection or disconnection between the second node and the fourth node, and adjusts the potential of the first node, the potential of the second node and the potential of the third node through the coupling effect; the light emission control circuit controls, based on the light emission control signal, the connection or disconnection between the reference power supply terminal and the first node and the connection or disconnection between the fourth node and the light-emitting element; and the drive circuit transmits, based on the potential of the second node and the driving power supply signal, the driving signal to the fourth node to drive the light-emitting element to emit light. In this way, the signal provided by each signal terminal can be flexibly set to achieve a reliable compensation for the threshold voltage of the driving transistor in the drive circuit, thereby ensuring a good display effect.

Additionally, since data is directly written into the second node under the coupling effect of the potential adjustment circuit instead of being written into the second node through the drive circuit, data writing and compensation for the threshold voltage can be achieved through different paths by different circuits, and thus data writing and compensation for the threshold voltage can be separated from each other without affecting each other, which ensures the effective compensation for the threshold voltage, and further ensures a better display effect. Moreover, on the basis of flexibly setting the reference power supply signals provided by the first reference power supply terminal and the second reference power supply terminal, the reference power supply signal at a higher potential can be written into the gate of the driving transistor in the drive circuit in the hold frame, thereby ensuring that the driving transistor is reset reliably in an off state, and ensuring a good display stability, especially at the low frame rate.

Figure 2:
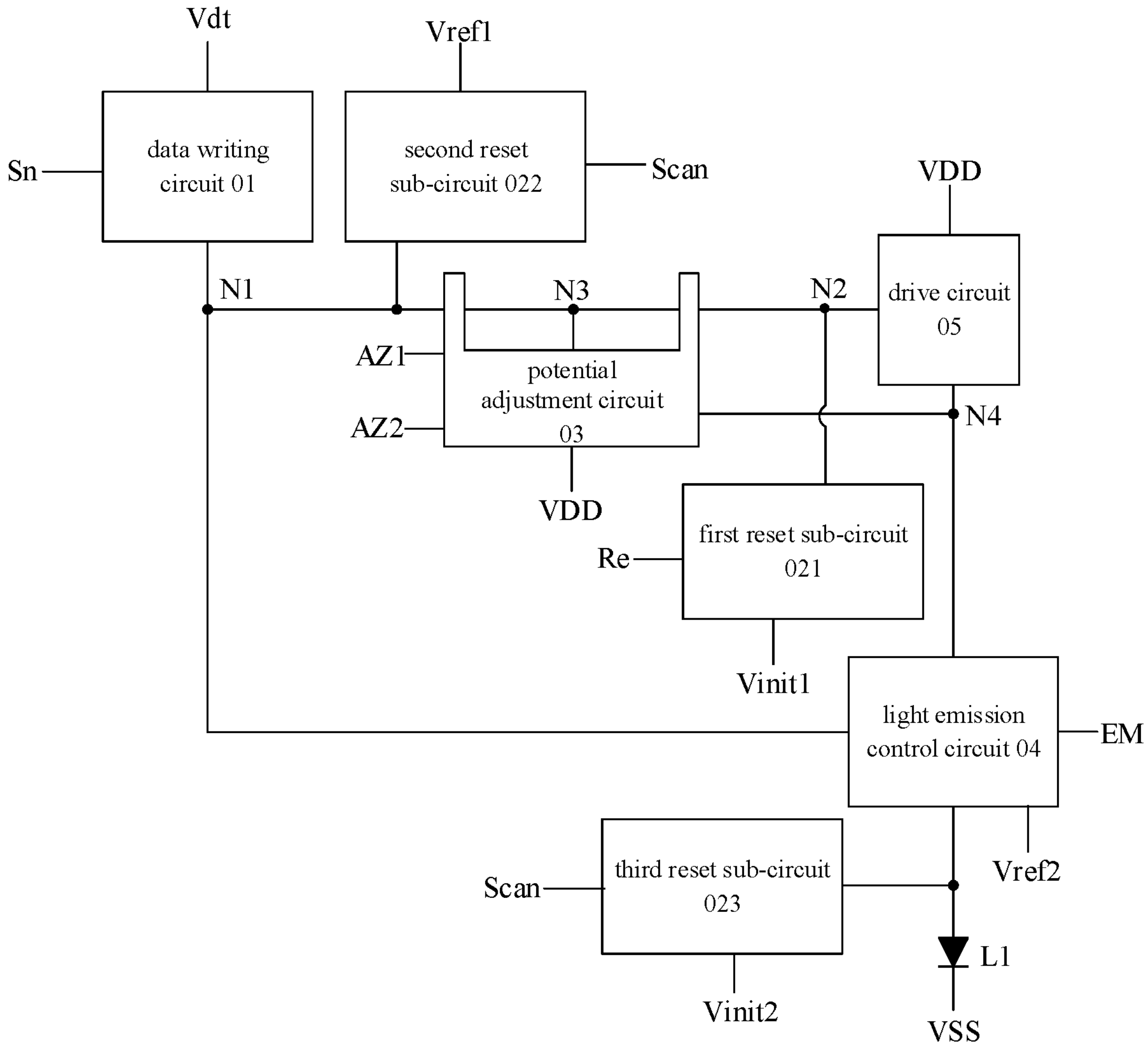
FIG. 2 is a schematic structural diagram of another pixel circuit according to some embodiments of the present disclosure.

FIG. 2 is a schematic structural diagram of another pixel circuit according to some embodiments of the present disclosure. As shown in FIG. 2, the reset circuit 02 includes a first reset sub-circuit 021, a second reset sub-circuit 022, and a third reset sub-circuit 023.

The first reset sub-circuit 021 is coupled to the reset signal terminal Re, the first initial power supply terminal Vinit1, and the second node N2. The first reset sub-circuit 021 is configured to control the connection or disconnection between the first initial power supply terminal Vinit1 and the second node N2 based on the reset signal.

For example, the first reset sub-circuit 021 controls the first initial power supply terminal Vinit1 to be connected to the second node N2 when the potential of the reset signal is the first potential, and controls the first initial power supply terminal Vinit1 to be disconnected from the second node N2 when the potential of the reset signal is the second potential.

The second reset sub-circuit 022 is coupled to the scanning signal terminal Scan, the first reference power supply terminal Vref1, and the first node N1. The second reset sub-circuit 022 is configured to control the connection or disconnection between the first reference power supply terminal Vref1 and the first node N1 based on the scanning signal.

For example, the second reset sub-circuit 022 controls the first reference power supply terminal Vref1 to be connected to the first node N1 when the potential of the scanning signal is the first potential, and controls the first reference power supply terminal Vref1 to be disconnected from the first node N1 when the potential of the scanning signal is the second potential.

The third reset sub-circuit 023 is coupled to the scanning signal terminal Scan, the second initial power supply terminal Vinit2, and the light-emitting element L1. The third reset sub-circuit 023 is configured to control the connection or disconnection between the second initial power supply terminal Vinit2 and the light-emitting element L1 based on the scanning signal. Optionally, as described in the foregoing embodiments, the third reset sub-circuit 023 is coupled to the anode of the light-emitting element L1, and controls the connection or disconnection between the second initial power supply terminal Vinit2 and the anode of the light-emitting element L1.

For example, the third reset sub-circuit 023 controls the second initial power supply terminal Vinit2 to be connected to the light-emitting element L1 when the potential of the scanning signal is the first potential, and controls the second initial power supply terminal Vinit2 to be disconnected from the light-emitting element L1 when the potential of the scanning signal is the second potential.

Figure 3:
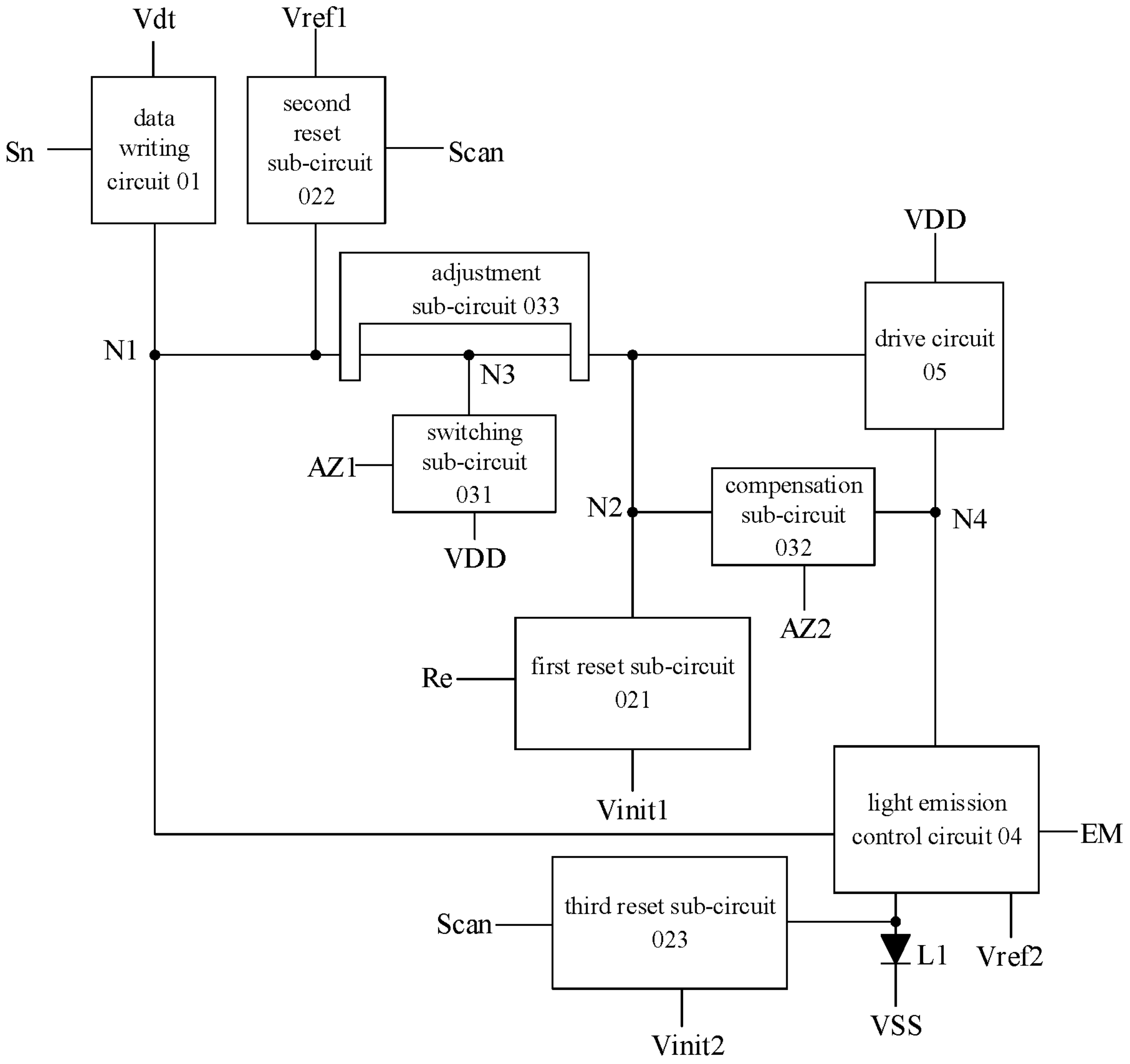
FIG. 3 is a schematic structural diagram of still another pixel circuit according to some embodiments of the present disclosure.

FIG. 3 is a schematic structural diagram of still another pixel circuit according to some embodiments of the present disclosure. As shown in FIG. 3, the potential adjustment circuit 03 includes a switching sub-circuit 031, a compensation sub-circuit 032, and an adjustment sub-circuit 033.

The switching sub-circuit 031 is coupled to the first compensation terminal AZ1, the driving power supply terminal VDD, and the third node N3. The switching sub-circuit 031 is configured to control the connection or disconnection between the driving power supply terminal VDD and the third node N3 based on the first compensation signal.

For example, the switching sub-circuit 031 controls the driving power supply terminal VDD to be connected to the third node N3 when the potential of the first compensation signal is the first potential, and controls the driving power supply terminal VDD to be disconnected from the third node N3 when the potential of the first compensation signal is the second potential.

The compensation sub-circuit 032 is coupled to the second compensation terminal AZ2, the second node N2, and the fourth node N4. The compensation sub-circuit 032 is configured to control the connection or disconnection between the second node N2 and the fourth node N4 based on the second compensation signal.

For example, the compensation sub-circuit 032 controls the second node N2 to be connected to the fourth node N4 when the potential of the second compensation signal is the first potential, and controls the second node N2 to be disconnected from the fourth node N4 when the potential of the second compensation signal is the second potential.

The adjustment sub-circuit 033 is coupled to the first node N1, the second node N2, and the third node N3. The adjustment sub-circuit 033 is configured to adjust the potential of the first node N1, the potential of the second node N2, and the potential of the third node N3 through the coupling effect.

Figure 4:
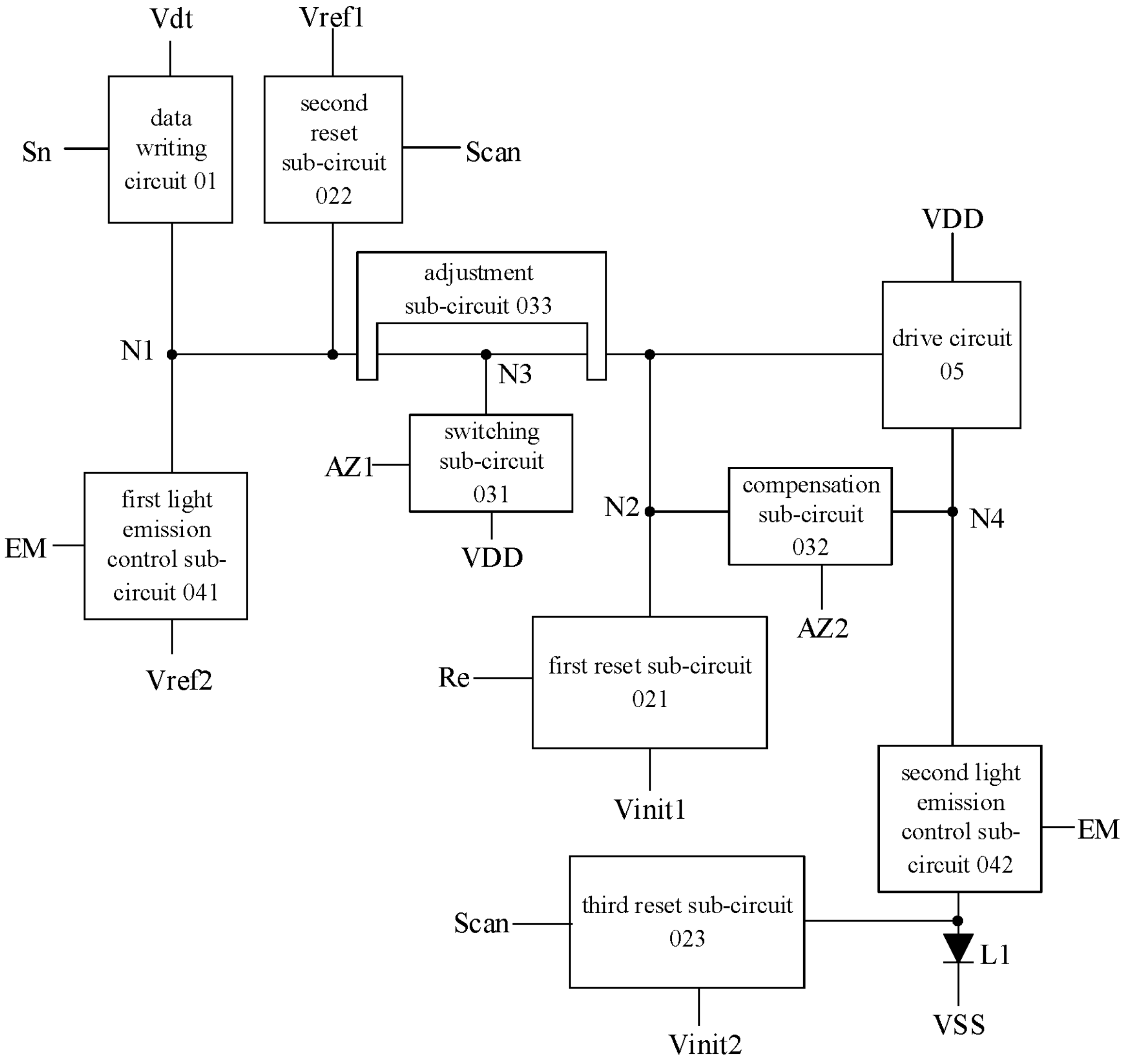
FIG. 4 is a schematic structural diagram of yet another pixel circuit according to some embodiments of the present disclosure.

FIG. 4 is a schematic structural diagram of still another pixel circuit according to some embodiments of the present disclosure. As shown in FIG. 4, the light emission control circuit 04 includes a first light emission control sub-circuit 041 and a second light emission control sub-circuit 042.

The first light emission control sub-circuit 041 is coupled to the light emission control terminal EM, the second reference power supply terminal Vref2, and the first node N1. The first light emission control sub-circuit 041 is configured to control the connection or disconnection between the second reference power supply terminal Vref2 and the first node N1 based on the light emission control signal.

For example, the first light emission control sub-circuit 041 controls the second reference power supply terminal Vref2 to be connected to the first node N1 when the potential of the light emission control signal is the first potential, and controls the second reference power supply terminal Vref2 to be disconnected from the first node N1 when the potential of the light emission control signal is the second potential.

The second light emission control sub-circuit 042 is coupled to the light emission control terminal EM, the fourth node N4, and the light-emitting element L1. The second light emission control sub-circuit 042 is configured to control the connection or disconnection between the fourth node N4 and the light-emitting element L1 based on the light emission control signal. Optionally, as described in the foregoing embodiments, the second light emission control sub-circuit 042 is coupled to the anode of the light-emitting element L1, and controls the connection or disconnection between the fourth node N4 and the anode of the light-emitting element L1.

For example, the second light emission control sub-circuit 042 controls the fourth node N4 to be connected to the light-emitting element L1 when the potential of the light emission control signal is the first potential, and controls the fourth node N4 to be disconnected from the light-emitting element L1 when the potential of the light emission control signal is the second potential.

Figure 5:
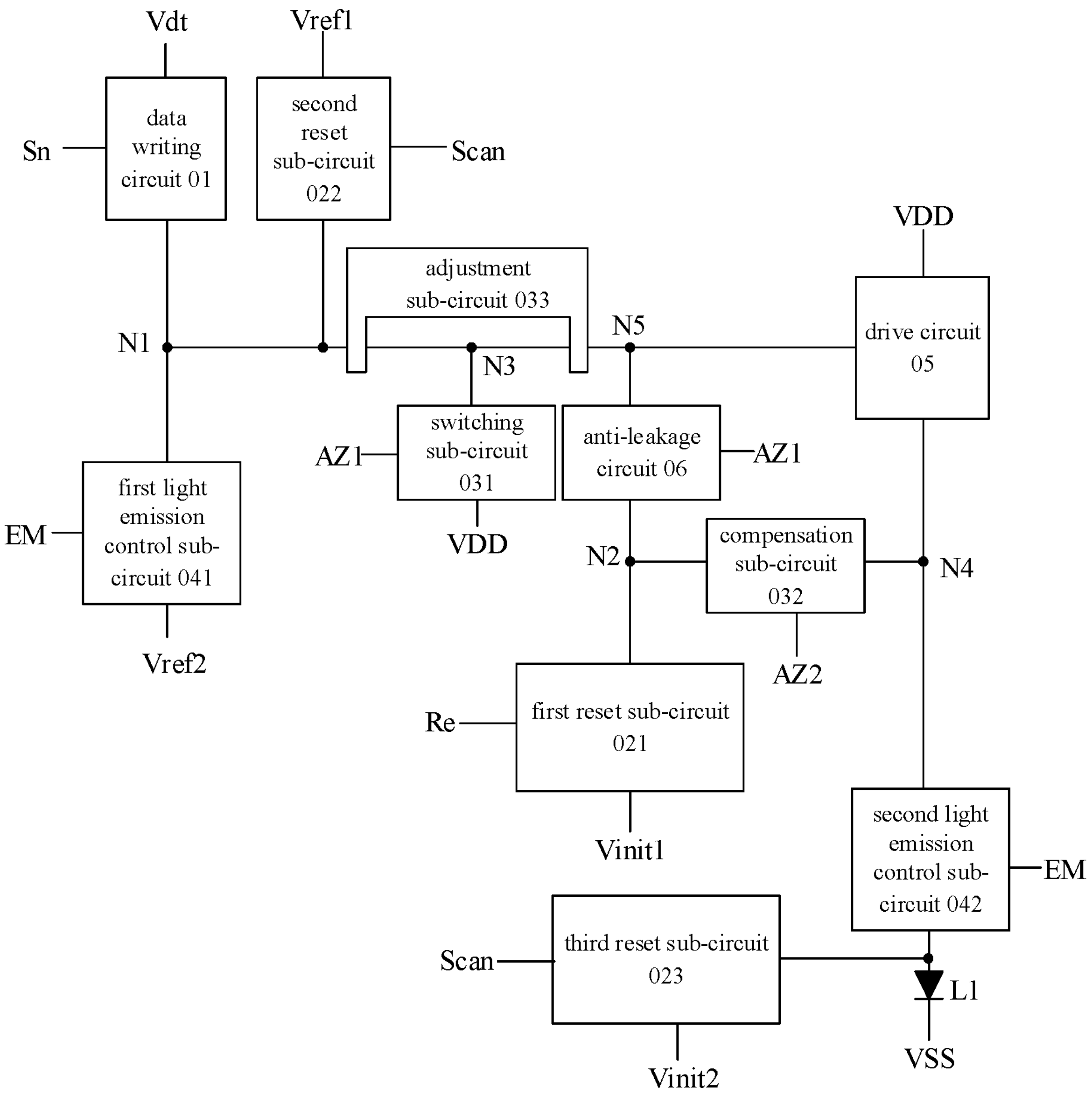
FIG. 5 is a schematic structural diagram of yet another pixel circuit according to some embodiments of the present disclosure.

FIG. 5 is a schematic structural diagram of still another pixel circuit according to some embodiments of the present disclosure. As shown in FIG. 5, the pixel circuit described in the embodiments of the present disclosure further includes an anti-leakage circuit 06.

The anti-leakage circuit 06 is coupled to the first compensation terminal AZ1, the second node N2, and a fifth node N5. The anti-leakage circuit 06 is configured to control the connection or disconnection between the second node N2 and the fifth node N5 based on the first compensation signal.

For example, the anti-leakage circuit 06 controls the second node N2 to be connected to the fifth node N5 when the potential of the first compensation signal is the first potential, and controls the second node N2 to be disconnected from the fifth node N5 when the potential of the first compensation signal is the second potential.

On this basis, with continued reference to FIG. 5, it can be seen that the potential adjustment circuit 03 is further coupled to the fifth node N5. For example, the compensation sub-circuit 032 and the adjustment sub-circuit 033 in the potential adjustment circuit 03 are coupled to the fifth node N5. In addition, the drive circuit 05 is coupled to the second node N2 through the fifth node N5. That is, the drive circuit 05 is indirectly coupled to the second node N2 through the anti-leakage circuit 06.

Additionally, the potential adjustment circuit 03 controls the fourth node N4 to be connected to the second node N2 when the potential of the second compensation signal is the first potential, and on this basis, when the anti-leakage circuit 06 controls the second node N2 to be connected to the fifth node N5, the fourth node N4 is indirectly connected to the fifth node N5. Similarly, when the anti-leakage circuit 06 controls the second node N2 to be connected to the fifth node N5, the first initial power supply terminal Vinit1 is indirectly connected to the fifth node N5. The potential adjustment circuit 03 controls the fourth node N4 to be disconnected from the fifth node N5 when the potential of the second compensation signal is the second potential. The potential adjustment circuit 03 adjusts the potential of the first node N1, the potential of the third node N3, and the potential of the fifth node N5.

Based on the above embodiments, it can be known that by providing the anti-leakage circuit 06, the drive circuit 05 is indirectly coupled with the second node N2, and the first initial power supply terminal Vinit1 and the fourth node N4 are indirectly connected to or disconnected from the fifth node N5 through the second node N2. In this way, the potential of the fifth node N5 (e.g., the gate of the driving transistor) is prevented from leakage, that is, the potential stability of the fifth node N5 is improved.

Figure 6:
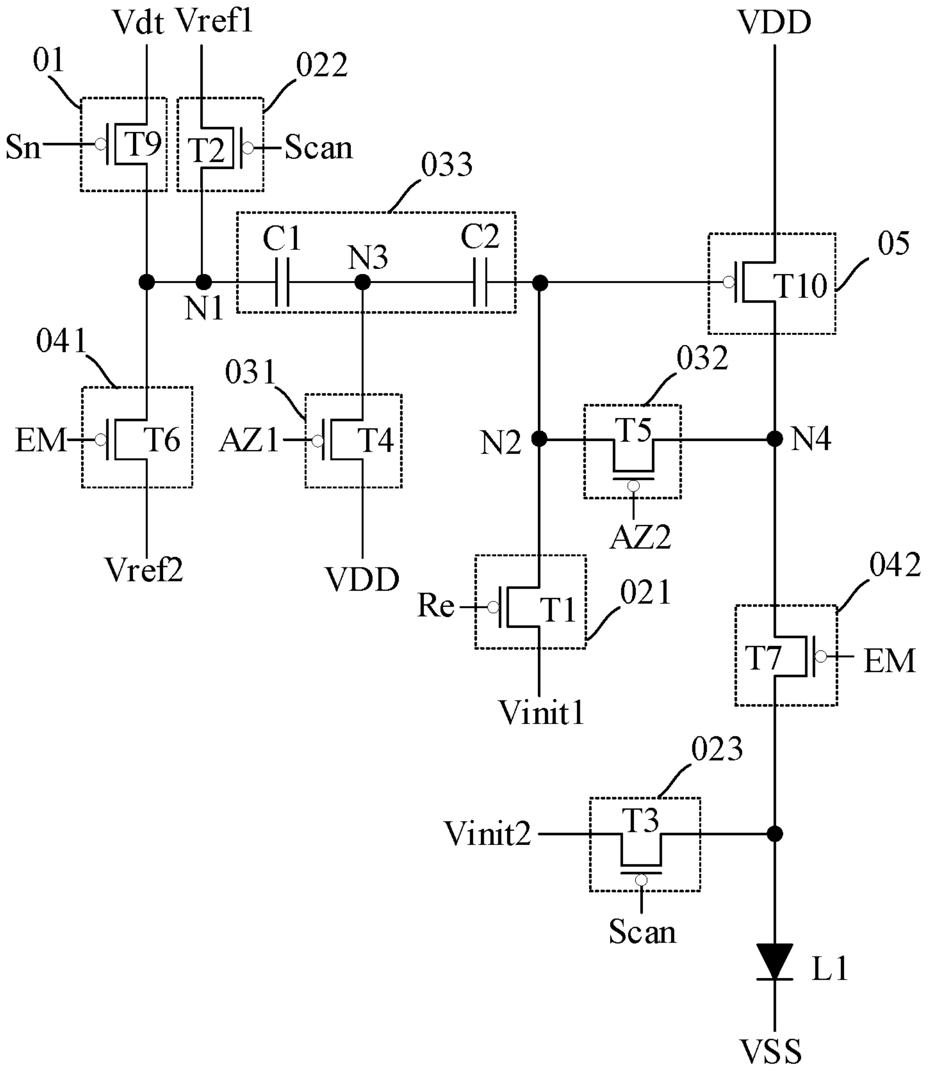
FIG. 6 is a schematic structural diagram of yet another pixel circuit according to some embodiments of the present disclosure.

Taking the structure shown in FIG. 4 as an example, FIG. 6 shows a schematic diagram of a circuit structure of a pixel circuit. Taking the structure shown in FIG. 5 as an example, FIG. 7 shows a schematic diagram of a circuit structure of another pixel circuit.

Figure 7:
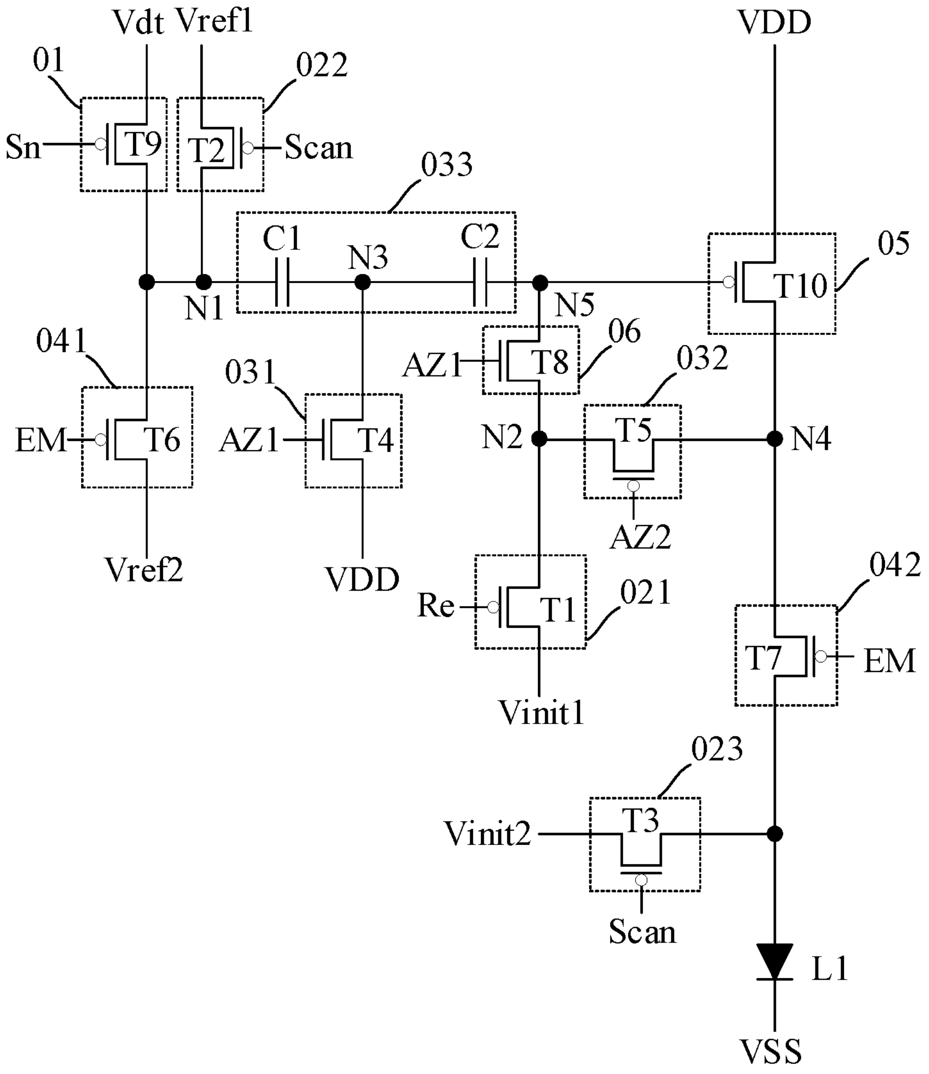
FIG. 7 is a schematic structural diagram of yet another pixel circuit according to some embodiments of the present disclosure.

As can be seen from FIG. 6 and FIG. 7, in the embodiments of the present disclosure, the first reset sub-circuit 021 includes a first transistor T1; the second reset sub-circuit 022 includes a second transistor T2; and the third reset sub-circuit 023 includes a third transistor T3.

A gate of the first transistor T1 is coupled to the reset signal terminal Re, a first electrode of the first transistor T1 is coupled to the first initial power supply terminal Vinit1, and a second electrode of the first transistor T1 is coupled to the second node N2.

A gate of the second transistor T2 is coupled to the scanning signal terminal Scan, a first electrode of the second transistor T2 is coupled to the first reference power supply terminal Vref1, and a second electrode of the second transistor T2 is coupled to the first node N1.

A gate of the third transistor T3 is coupled to the scanning signal terminal Scan, a first electrode of the third transistor T3 is coupled to the second initial power supply terminal Vinit2, and a second electrode of the third transistor T3 is coupled to the light-emitting element L1. Optionally, as described in the foregoing embodiments, the second electrode of the third transistor T3 is coupled to the anode of the light-emitting element L1.

In some embodiments, with continued reference to FIG. 6 and FIG. 7, it can be seen that the switching sub-circuit 031 includes a fourth transistor T4; the compensation sub-circuit 032 includes a fifth transistor T5; and the adjustment sub-circuit 033 includes a first capacitor C1 and a second capacitor C2.

A gate of the fourth transistor T4 is coupled to the first compensation terminal AZ1, a first electrode of the fourth transistor T4 is coupled to the driving power supply terminal VDD, and a second electrode of the fourth transistor T4 is coupled to the third node N3.

A gate of the fifth transistor T5 is coupled to the second compensation terminal AZ2, a first electrode of the fifth transistor T5 is coupled to the fourth node N4, and a second electrode of the fifth transistor T5 is coupled to the second node N2.

The first capacitor C1 is connected in series between the first node N1 and the third node N3. The first capacitor C1 is also referred to as a node potential storage capacitor Cst.

The second capacitor C2 is connected in series between the third node N3 and the second node N2. The second capacitor C2 is also referred to as a threshold voltage storage capacitor Cvth.

When the first reference power supply terminal Vref1 transmits the first reference power supply signal at a relatively high potential to the first node N1 through the second transistor T2, the potential of the third node N3 can be pulled up synchronously through the node potential storage capacitor Cst, and the potential of the gate of the driving transistor (i.e., a tenth transistor T10) can be pulled up through the threshold voltage storage capacitor Cvth, thereby ensuring that the driving transistor is reliably reset in an off state, and improving the display stability of the display panel at the low frame rate.

In some embodiments, with continued reference to FIG. 6 and FIG. 7, it can be seen that the first light emission control sub-circuit 041 includes a sixth transistor T6, and the second light emission control sub-circuit 042 includes a seventh transistor T7.

A gate of the sixth transistor T6 is coupled to the light emission control terminal EM, a first electrode of the sixth transistor T6 is coupled to the second reference power supply terminal Vref2, and a second electrode of the sixth transistor T6 is coupled to the first node N1.

A gate of the seventh transistor T7 is coupled to the light emission control terminal EM, a first electrode of the seventh transistor T7 is coupled to the fourth node N4, and a second electrode of the seventh transistor T7 is coupled to the light-emitting element L1. Optionally, as described in the foregoing embodiments, the second electrode of the seventh transistor T7 is coupled to the anode of the light-emitting element L1.

In some embodiments, with continued reference to FIG. 6 and FIG. 7, it can be seen that the data writing circuit 01 includes a ninth transistor T9, and the drive circuit 05 includes a tenth transistor T10 (i.e., the driving transistor).

A gate of the ninth transistor T9 is coupled to the gate signal terminal Sn, a first electrode of the ninth transistor T9 is coupled to the data terminal Vdt, and a second electrode of the ninth transistor T9 is coupled to the first node N1.

A gate of the tenth transistor T10 is coupled to the second node N2, a first electrode of the tenth transistor T10 is coupled to the driving power supply terminal VDD, and a second electrode of the tenth transistor T10 is coupled to the fourth node N4.

In some embodiments, with continued reference to FIG. 7, it can be seen that the anti-leakage circuit 06 includes an eighth transistor T8.

A gate of the eighth transistor T8 is coupled to the first compensation terminal AZ1, a first electrode of the eighth transistor T8 is coupled to the fifth node N5, and a second electrode of the eighth transistor T8 is coupled to the second node N2.

As can be seen from a comparison of FIG. 6 and FIG. 7, on the basis that the anti-leakage circuit 06 is not included, the other terminal of the second capacitor C2 and the gate of the tenth transistor T10 are both directly coupled to the second node N2. On the basis that the anti-leakage circuit 06 is included, the other terminal of the second capacitor C2 and the gate of the tenth transistor T10 are both indirectly coupled to the second node N2 through the eighth transistor T8.

Optionally, in the embodiments of the present disclosure, on the basis of providing the anti-leakage circuit 06, the material of the transistor (i.e., the first transistor T1) controlling the connection or disconnection between the first initial power supply terminal Vinit1 and the second node N2 in the reset circuit 02 and the material of the transistor controlling the connection or disconnection between the fourth node N4 and the second node N2 in the potential adjustment circuit 03 both include a low temperature polysilicon (LTPS) material. The material of the transistor (i.e., the eighth transistor T8) in the anti-leakage circuit 06 includes an oxide material. In addition, similar to the eighth transistor T8, the material of the fourth transistor T4 coupled to the first compensation terminal AZ1 also includes an oxide material. It should be noted that the material of the transistor herein refers to the material of the active layer included in the transistor. It should be noted that a pixel circuit is considered as a circuit of the LTPO structure in the case that the pixel circuit includes both a transistor including the LTPS material and a transistor including the oxide material; and a pixel circuit is considered as a circuit of the LTPS structure in the case that the pixel circuit only includes the transistor including the LTPS material.

In some embodiments, with continued reference to FIG. 7, it can be seen that the first transistor T1 and the fifth transistor T5 made from the LTSP material are both P-type transistors; and the eighth transistor T8 and the fourth transistor T4 made from the oxide material are both N-type transistors. In addition, the other transistors except the first transistor T1, the fourth transistor T4, the fifth transistor T5 and the eighth transistor T8 are P-type transistors. Further, with continued reference to FIG. 6, it can be seen that each transistor in the pixel circuit shown in FIG. 6 is a P-type transistor, and the material of the P-type transistor is the LTPS material described in the foregoing embodiments. That is, the pixel circuit shown in FIG. 6 is a circuit of the LTPS structure. The pixel circuit shown in FIG. 7 is a circuit of the LTPO structure. For P-type transistors, the first potential is a low potential, and the second potential is a high potential. For N-type transistors, the first potential is a high potential, and the second potential is a low potential.

The N-type transistors made from the oxide material have better anti-leakage capability than the P-type transistors made from the LTPS material. Therefore, in combination with FIG. 7, on the basis that the first transistor T1 and the fifth transistor T5 are provided as P-type transistors made from the LTPS material, by adding the N-type transistor (i.e., the eighth transistor T8) made from the oxide material, the potential of the second node N2 can be reliably prevented from leakage on the premise of simplifying the process as there is no need to provide the first transistor T1 and the fifth transistor T5 as N-type transistors made from the oxide material.

In summary, the embodiments of the present disclosure provide a pixel circuit. In the pixel circuit, the data writing circuit controls the connection or disconnection between the data terminal and the first node based on the gate driving signal; the reset circuit controls, based on the reset signal and the scanning signal, the connection or disconnection between the initial power supply terminal and the second node and between the initial power supply terminal and the light-emitting element, and the connection or disconnection between the reference power supply terminal and the first node; the potential adjustment circuit controls, based on the compensation signal, the connection or disconnection between the driving power supply terminal and the third node and the connection or disconnection between the second node and the fourth node, and adjusts the potential of the first node, the potential of the second node and the potential of the third node through the coupling effect; the light emission control circuit controls, based on the light emission control signal, the connection or disconnection between the reference power supply terminal and the first node and the connection or disconnection between the fourth node and the light-emitting element; and the drive circuit transmits, based on the potential of the second node and the driving power supply signal, the driving signal to the fourth node to drive the light-emitting element to emit light. In this way, the signal provided by each signal terminal can be flexibly set to achieve a reliable compensation for the threshold voltage of the driving transistor in the drive circuit, thereby ensuring a good display effect.

Additionally, since data is directly written into the second node under the coupling effect of the potential adjustment circuit instead of being written into the second node through the drive circuit, data writing and compensation for the threshold voltage can be achieved through different paths by different circuits, and thus data writing and compensation for the threshold voltage can be separated from each other without affecting each other, which ensures the effective compensation for the threshold voltage, and further ensures a better display effect. Moreover, on the basis of flexibly setting the reference power supply signals provided by the first reference power supply terminal and the second reference power supply terminal, the reference power supply signal at a higher potential can be written into the gate of the driving transistor in the drive circuit in the hold frame, thereby ensuring that the driving transistor is reset reliably in an off state, and ensuring a good display stability, especially at the low frame rate.

Figure 8:
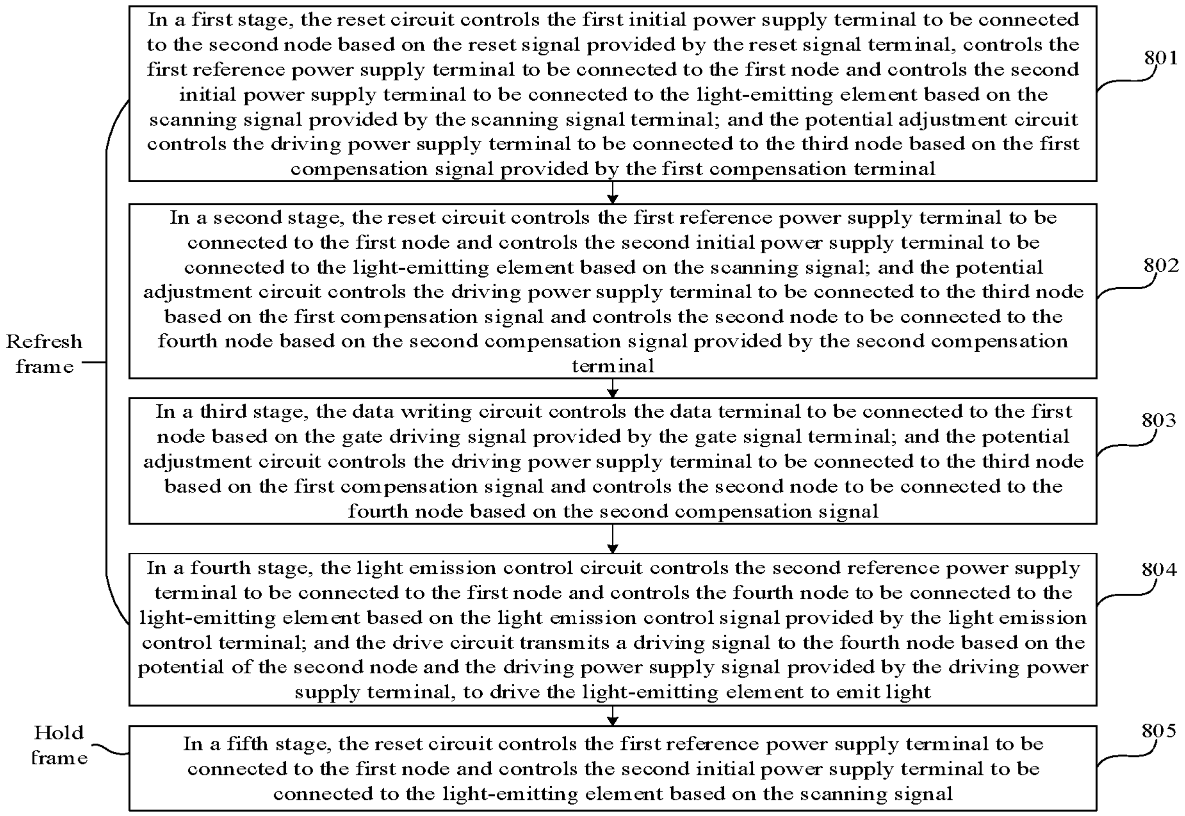
FIG. 8 is a flowchart of a method for driving a pixel circuit according to some embodiments of the present disclosure.

FIG. 8 is a method for driving a pixel circuit according to some embodiments of the present disclosure. This method is applicable to the pixel circuit shown in any one of FIG. 1 to FIG. 7. As shown in FIG. 8, the driving method includes the following steps.

In step 801, in a first stage, the reset circuit controls the first initial power supply terminal to be connected to the second node based on the reset signal provided by the reset signal terminal, controls the first reference power supply terminal to be connected to the first node and controls the second initial power supply terminal to be connected to the light-emitting element based on the scanning signal provided by the scanning signal terminal; and the potential adjustment circuit controls the driving power supply terminal to be connected to the third node based on the first compensation signal provided by the first compensation terminal.

In step 802, in a second stage, the reset circuit controls the first reference power supply terminal to be connected to the first node and controls the second initial power supply terminal to be connected to the light-emitting element based on the scanning signal; and the potential adjustment circuit controls the driving power supply terminal to be connected to the third node based on the first compensation signal and controls the second node to be connected to the fourth node based on the second compensation signal provided by the second compensation terminal.

In step 803, in a third stage, the data writing circuit controls the data terminal to be connected to the first node based on the gate driving signal provided by the gate signal terminal; and the potential adjustment circuit controls the driving power supply terminal to be connected to the third node based on the first compensation signal and controls the second node to be connected to the fourth node based on the second compensation signal.

In step 804, in a fourth stage, the light emission control circuit controls the second reference power supply terminal to be connected to the first node and controls the fourth node to be connected to the light-emitting element based on the light emission control signal provided by the light emission control terminal; and the drive circuit transmits a driving signal to the fourth node based on the potential of the second node and the driving power supply signal provided by the driving power supply terminal, to drive the light-emitting element to emit light.

In step 805, in a fifth stage, the reset circuit controls the first reference power supply terminal to be connected to the first node and controls the second initial power supply terminal to be connected to the light-emitting element based on the scanning signal.

The potential of the second reference power supply signal provided by the second reference power supply terminal is lower than the potential of the first reference power supply signal provided by the first reference power supply terminal. In addition, the first stage, the second stage, the third stage, the fourth stage and the fifth stage are sequentially executed. In each stage, the potential adjustment circuit adjusts the potential of the first node, the potential of the second node and the potential of the third node through the coupling effect.

It should be noted that the first stage to the fourth stage are the refresh frame stage described in the foregoing embodiments; and the fifth stage is the hold frame stage described in the foregoing embodiments.

In some embodiments, with continued reference to FIG. 5 and FIG. 7, it can be seen that in an embodiment of the present disclosure, the pixel circuit further includes an anti-leakage circuit 06. On this basis, the method described in the embodiments of the present disclosure further includes that the anti-leakage circuit controls the second node to be connected to the fifth node based on the first compensation signal in the first stage to the third stage. Moreover, as can also be seen from FIG. 5 and FIG. 7, on the basis that the anti-leakage circuit 06 is included, the potential adjustment circuit 03 is further coupled to the fifth node N5, and the drive circuit 05 is coupled to the second node N2 through the fifth node N5.

In some embodiments, on the basis of the structure shown in FIG. 6 and FIG. 7, FIG. 9 and FIG. 10 show two working timing diagrams of two pixel circuits respectively, each including two stages, i.e., a refresh frame and a hold frame. As can be seen from FIG. 9 and FIG. 10, the refresh frame includes four stages, i.e., a first stage t1, a second stage t2, a third stage t3, and a fourth stage t4, and the hold frame includes the fifth stage described in the above embodiments.

First, in the First Stage t1:

For the structures shown in FIG. 6 and FIG. 7, the potential of the reset signal provided by the reset signal terminal Re and the potential of the scanning signal provided by the scanning signal terminal Scan are both the low potential; and the potential of the second compensation signal provided by the second compensation terminal AZ2, the potential of the gate driving signal provided by the gate signal terminal Sn, and the potential of the light emission control signal provided by the light emission control terminal EM are all the high potential. For the structure shown in FIG. 6, the potential of the first compensation signal provided by the first compensation terminal AZ1 is the low potential. For the structure shown in FIG. 7, the potential of the first compensation signal provided by the first compensation terminal AZ1 is the high potential. That is, for the structure shown in FIG. 6, the potentials of the signals provided by the reset signal terminal Re, the scanning signal terminal Scan, and the first compensation terminal AZ1 are all set low, and the potentials of the signals provided by the second compensation terminal AZ2, the gate signal terminal Sn, and the light emission control terminal EM are all set high. For the structure shown in FIG. 7, the potentials of the signals provided by the reset signal terminal Re and the scanning signal terminal Scan are both set low, and the potentials of the signals provided by the second compensation terminal AZ2, the gate signal terminal Sn, the light emission control terminal EM, and the first compensation terminal AZ1 are all set high. Correspondingly, in the structures shown in FIG. 6 and FIG. 7, the first transistor T1, the second transistor T2, the third transistor T3 and the fourth transistor T4 are all turned on; and the fifth transistor T5, the sixth transistor T6, the seventh transistor T7 and the ninth transistor T9 are all turned off. In the structure shown in FIG. 7, the eighth transistor T8 is turned on.

Further, in the structures shown in FIG. 6 and FIG. 7, the first initial power supply signal provided by the first initial power supply terminal Vinit1 is transmitted to the second node N2 through the turned-on first transistor T1; the first reference power supply signal provided by the first reference power supply terminal Vref1 is transmitted to the first node N1 through the turned-on second transistor T2; the second initial power supply signal provided by the second initial power supply terminal Vinit2 is transmitted to the anode of the light-emitting element L1 through the turned-on third transistor T3; and the driving power supply signal provided by the driving power supply terminal VDD is transmitted to the third node N3 through the turned-on fourth transistor T4. In addition, in the structure shown in FIG. 7, the first initial power supply signal transmitted to the second node N2 continues to be transmitted to the fifth node N5 through the turned-on eighth transistor T8.

For example, assuming that the potential of the first initial power supply signal is Vinit10, the potential of the second initial power supply signal is Vinit20, the potential of the first reference power supply signal is Vref10, and the potential of the driving power supply signal is Vdd, then in the first stage t1, the potential of the first node N1 is controlled to be Vref10, the potential of the second node N2 and the potential of the fifth node N5 are controlled to be Vinit10, the potential of the third node N3 is controlled to be Vdd, and the potential of the anode of the light-emitting element L1 is controlled to be Vinit20, thereby resetting the first node N1, the second node N2, the fifth node N5 and the anode of the light-emitting element L1. Thus, the tenth transistor T10 is turned on. That is, in the first stage t1, the potentials at two terminals of the first capacitor C1 are Vref10 and Vdd, and the potentials at two terminals of the second capacitor C2 are Vdd and Vinit10. The first stage t1 is also referred to as a reset stage.

Next, in the Second Stage t2:

For the structures shown in FIG. 6 and FIG. 7, the potential of the second compensation signal provided by the second compensation terminal AZ2 and the potential of the scanning signal provided by the scanning signal terminal Scan are both the low potential; the potential of the reset signal provided by the reset signal terminal Re, the potential of the gate driving signal provided by the gate signal terminal Sn, and the potential of the light emission control signal provided by the light emission control terminal EM are all the high potential. For the structure shown in FIG. 6, the potential of the first compensation signal provided by the first compensation terminal AZ1 is the low potential. For the structure shown in FIG. 7, the potential of the first compensation signal provided by the first compensation terminal AZ1 is the high potential. That is, for the structure shown in FIG. 6, the potentials of signals provided by the first compensation terminal AZ1, the second compensation terminal AZ2 and the scanning signal terminal Scan are all set low, and the potentials of signals provided by the reset signal terminal Re, the gate signal terminal Sn and the light emission control terminal EM are all set high. For the structure shown in FIG. 7, the potentials of signals provided by the second compensation terminal AZ2 and the scanning signal terminal Scan are both set low, and the potentials of signals provided by the first compensation terminal AZ1, the reset signal terminal Re, the gate signal terminal Sn and the light emission control terminal EM are all set high. Correspondingly, in the structures shown in FIG. 6 and FIG. 7, the second transistor T2, the third transistor T3, the fourth transistor T4 and the fifth transistor T5 are all turned on, and the first transistor T1, the sixth transistor T6, the seventh transistor T7 and the ninth transistor T9 are all turned off. In the structure shown in FIG. 7, the eighth transistor T8 is turned on. In addition, under the coupling effect of the second capacitor C2, the signal at the second node N2 remains as the first initial power supply signal in the first stage, and the tenth transistor T10 is turned on.

Further, in the structures shown in FIG. 6 and FIG. 7, the first reference power supply signal provided by the first reference power supply terminal Vref1 continues to be transmitted to the first node N1 through the turned-on second transistor T2; the second initial power supply signal provided by the second initial power supply terminal Vinit2 continues to be transmitted to the anode of the light-emitting element L1 through the turned-on third transistor T3; the driving power supply signal provided by the driving power supply terminal VDD continues to be transmitted to the third node N3 through the turned-on fourth transistor T4; the fourth node N4 is connected to the second node N2; the second node N2 is connected to the fifth node N5; and the driving power supply signal provided by the driving power supply terminal VDD is transmitted to the second node N2 through the turned-on tenth transistor T10 and the turned-on fifth transistor T5 (i.e., T10-T5 path), so that the potential of the second node N2 is related to the driving power supply signal and the threshold voltage Vth of the tenth transistor T10 (i.e., the driving transistor). Moreover, in the structure shown in FIG. 7, the potential transmitted to the second node N2 continues to be transmitted to the fifth node N5 through the turned-on eighth transistor T8.

For example, still assuming that the potential of the first initial power supply signal is Vinit10, the potential of the second initial power supply signal is Vinit20, the potential of the first reference power supply signal is Vref10, and the potential of the driving power supply signal is Vdd, then in the second stage t2, the potential of the first node N1 is controlled to be Vref10, the potential of the second node N2 and the potential of the fifth node N5 are both controlled to be Vdd+Vth, the potential of the third node N3 is controlled to be Vdd, and the potential of the anode of the light-emitting element L1 is controlled to be Vinit20. That is, in the second stage t2, the potentials at two terminals of the first capacitor C1 are Vref10 and Vdd, and the potentials at two terminals of the second capacitor C2 are Vdd and Vdd+Vth. The second stage t2 is also referred to as a compensation stage.

Then, in the Third Stage t3:

For the structures shown in FIG. 6 and FIG. 7, the potential of the second compensation signal provided by the second compensation terminal AZ2 and the potential of the gate driving signal provided by the gate signal terminal Sn are both the low potential; and the potential of the reset signal provided by the reset signal terminal Re, the potential of the scanning signal provided by the scanning signal terminal Scan, and the potential of the light emission control signal provided by the light emission control terminal EM are all the high potential. For the structure shown in FIG. 6, the potential of the first compensation signal provided by the first compensation terminal AZ1 is the low potential. For the structure shown in FIG. 7, the potential of the first compensation signal provided by the first compensation terminal AZ1 is the high potential. That is, for the structure shown in FIG. 6, the potentials of the signals provided by the first compensation terminal AZ1, the second compensation terminal AZ2 and the gate signal terminal Sn are all set low, and the potentials of the signals provided by the reset signal terminal Re, the scanning signal terminal Scan, and the light emission control terminal EM are all set high. For the structure shown in FIG. 7, the potentials of the signals provided by the second compensation terminal AZ2 and the gate signal terminal Sn are both set low, and the potentials of the signals provided by the first compensation terminal AZ1, the reset signal terminal Re, the scanning signal terminal Scan, and the light emission control terminal EM are all set high. Correspondingly, in the structures shown in FIG. 6 and FIG. 7, the fourth transistor T4, the fifth transistor T5 and the ninth transistor T9 are turned on, and the first transistor T1, the second transistor T2, the third transistor T3, the sixth transistor T6 and the seventh transistor T7 are turned off. In addition, in the structure shown in FIG. 7, the eighth transistor T8 is turned on.

Further, in the structures shown in FIG. 6 and FIG. 7, the driving power supply signal provided by the driving power supply terminal VDD continues to be transmitted to the third node N3 through the turned-on fourth transistor T4; the fourth node N4 remains connected to the second node N2; the second node N2 remains connected to the fifth node N5; the driving power supply signal provided by the driving power supply terminal VDD continues to be transmitted to the second node N2 through the turned-on tenth transistor T10 and the turned-on fifth transistor T5 (i.e., T10-T5 path). Moreover, in the structure shown in FIG. 7, the potential transmitted to the second node N2 continues to be transmitted to the fifth node N5 through the turned-on eighth transistor T8; and the data signal provided by the data terminal Vdt is transmitted to the first node N1 through the turned-on ninth transistor T9.

For example, still assuming that the potential of the first initial power supply signal is Vinit10, the potential of the second initial power supply signal is Vinit20, the potential of the first reference power supply signal is Vref10, the potential of the driving power supply signal is Vdd, and the potential of the data signal is Vdt0, then in the third stage t3, the potential of the first node N1 is Vdt0, the potential of the third node N3 is maintained as Vdd, and the potential of the second node N2 and the potential of the fifth node N5 are maintained as Vdd+Vth. That is, in the third stage t3, the potentials at two terminals of the first capacitor C1 are Vdt0 and Vdd, and the potentials at two terminals of the second capacitor C2 are Vdd and Vdd+Vth. The third stage t3 is also referred to as a data writing stage.

Finally, in the Fourth Stage t4:

For the structures shown in FIG. 6 and FIG. 7, the potential of the light emission control signal provided by the light emission control terminal EM is the low potential, and the potential of the second compensation signal provided by the second compensation terminal AZ2, the potential of the gate driving signal provided by the gate signal terminal Sn, the potential of the reset signal provided by the reset signal terminal Re, and the potential of the scanning signal provided by the scanning signal terminal Scan are all the high potential. For the structure shown in FIG. 6, the potential of the first compensation signal provided by the first compensation terminal AZ1 is the high potential. For the structure shown in FIG. 7, the potential of the first compensation signal provided by the first compensation terminal AZ1 is the low potential. That is, for the structure shown in FIG. 6, the potential of the light emission control signal provided by the light emission control terminal EM is set low, and the potentials of the signals provided by the first compensation terminal AZ1, the second compensation terminal AZ2, the gate signal terminal Sn, the reset signal terminal Re, and the scanning signal terminal Scan are all set high. For the structure shown in FIG. 7, the potentials of the signals provided by the light emission control terminal EM and the first compensation terminal AZ1 are set low, and the potentials of the signals provided by the second compensation terminal AZ2, the gate signal terminal Sn, the reset signal terminal Re, and the scanning signal terminal Scan are set high. Correspondingly, in the structures shown in FIG. 6 and FIG. 7, the sixth transistor T6 and the seventh transistor T7 are turned on, and the first transistor T1, the second transistor T2, the third transistor T3, the fourth transistor T4, the fifth transistor T5 and the ninth transistor T9 are all turned off. Moreover, in the structure shown in FIG. 7, the eighth transistor T8 is turned off. In addition, under the bootstrap effect of the second capacitor C2, the tenth transistor T10 remains turned-on.

Further, in the structures shown in FIG. 6 and FIG. 7, the second reference power supply signal provided by the second reference power supply terminal Vref2 is transmitted to the first node N1 through the turned-on sixth transistor T6.

For example, still assuming that the potential of the first initial power supply signal is Vinit10, the potential of the second initial power supply signal is Vinit20, the potential of the first reference power supply signal is Vref10, the potential of the driving power supply signal is Vdd, the potential of the data signal is Vdt0, and the potential of the second reference power supply signal is Vref20, then in the fourth stage t4, the potentials at two terminals of the first capacitor C1 are Vref20 and Vdd+Vref20−Vdt, the potential of the gate of the driving transistor is Vdd+Vref20−Vdt+Vth, a path is formed between the driving power supply terminal VDD and the pull-down power supply terminal VSS, and the tenth transistor T10 transmits a driving signal to the fourth node N4 based on the potential of the second node N2 and the driving power supply signal provided by the driving power supply terminal VDD. The driving signal continues to be transmitted to the anode of the light-emitting element L1 through the turned-on seventh transistor T7. The light-emitting element L1 emits light under the action of the voltage difference between the driving signal and the pull-down power supply signal provided by the pull-down power supply terminal VSS. The fourth stage t4 is also referred to as a light-emitting stage. With reference to the formula: $10=\frac{1}{2}\mu_n C_{ox}(W/L)*(Vgs-Vth)^2$ based on which the driving transistor (i.e., the tenth transistor T10) generates the driving signal, it can be known that on the basis that the threshold voltage Vth of the driving transistor is written into the second node N2 in the second stage t2 such that the gate-source voltage difference Vgs of the driving transistor equals to Vg−Vs=(Vdd+Vref20−Vdt+Vth)−Vdd=Vref20−Vdt+Vth in the fourth stage t4, the driving current 10 generated by the driving transistor satisfies $10=\frac{1}{2}\mu_n C_{ox}(W/L)*(Vref20-Vdt+Vth-Vth)=\frac{1}{2}\mu_n C_{ox}(W/L)*(Vdt0-Vref0)$, which is irrelevant to the threshold voltage Vth, thereby compensating the threshold voltage Vth. Here, un is the carrier mobility of the driving transistor, $C_{ox}$ is the capacitance of the gate insulating layer of the driving transistor, W/L is the width-to-length ratio of the driving transistor, all of which are constants after the manufacturing process of the display panel is determined.

Figure 9:
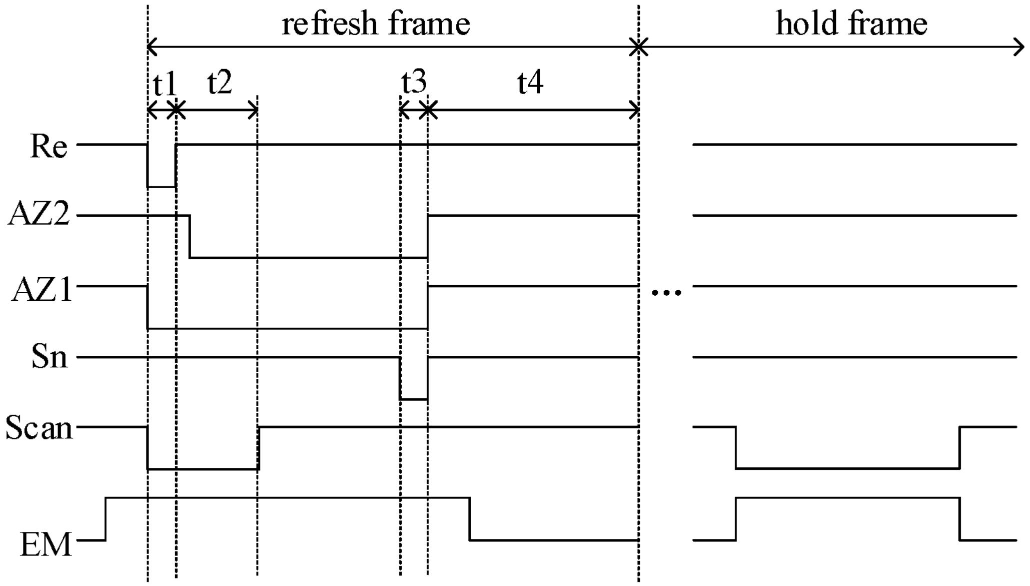
FIG. 9 is a signal timing diagram on the basis of the pixel circuit shown in FIG. 6 according to some embodiments of the present disclosure.
Figure 10:
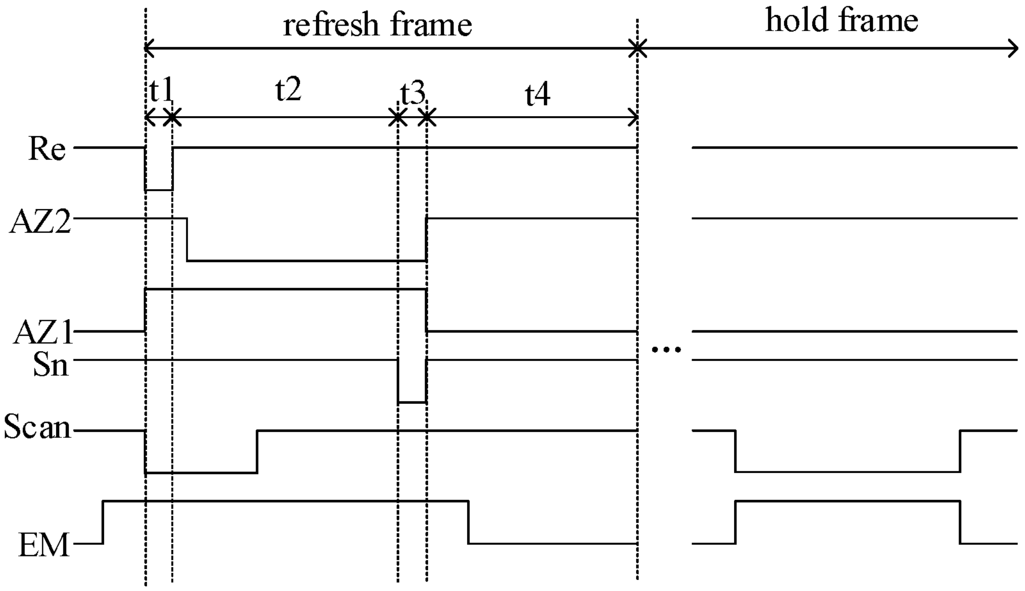
FIG. 10 is a signal timing diagram on the basis of the pixel circuit shown in FIG. 7 according to some embodiments of the present disclosure.

Still Referring to FIG. 9 and FIG. 10, it can be Seen that in the Hold Frame:

For the structures shown in FIG. 6 and FIG. 7, the potential of the scanning signal provided by the scanning signal terminal Scan is the low potential, the potential of the light emission control signal provided by the light emission control terminal EM is the high potential, and the potential of the reset signal provided by the reset signal terminal Re, the potential of the second compensation signal provided by the second compensation terminal AZ2, and the potential of the gate driving signal provided by the gate signal terminal Sn are all the high potential. For the structure shown in FIG. 6, the potential of the first compensation signal provided by the first compensation terminal AZ1 is the high potential. For the structure shown in FIG. 7, the potential of the first compensation signal provided by the first compensation terminal AZ1 is the low potential. That is, for the structure shown in FIG. 6, the potential of the scanning signal provided by the scanning signal terminal Scan is set low, and the potentials of signals provided by the other signal terminals are set high. For the structure shown in FIG. 7, the potentials of signals provided by the scanning signal terminal Scan and the first compensation terminal AZ1 are both set low, and the potentials of signals provided by the other signal terminals are set high. Correspondingly, in the structures shown in FIG. 6 and FIG. 7, the second transistor T2 and the third transistor T3 are turned on, and the other transistors except the second transistor T2 and the third transistor T3 are turned off.

Further, the first reference power supply signal provided by the first reference power supply terminal Vref1 is transmitted to the first node N1 through the turned-on second transistor T2, and the signal at the first node N1 is changed from the second reference power supply signal in the previous stage (that is, the fourth stage t4) to the first reference power supply signal, that is, the potential at the first node N1 is increased from the lower potential Vref20 of the second reference power supply signal to the higher potential Vref10 of the first reference power supply signal. Under the regulating effect of the first capacitor C1 and the second capacitor C2, the potential of the gate (e.g., the second node N2 shown in FIG. 6 or the fifth node N5 shown in FIG. 7) of the driving transistor T10 is further increased by about Vref10−Vref20. If the potential Vref10 of the first reference power supply signal is high enough, it can be ensured that the tenth transistor T10 (i.e., the driving transistor) is reliably turned off when displaying any picture, and thus the driving transistor can be reset in an off state. Moreover, the second initial power supply signal provided by the second initial power supply terminal Vinit2 is transmitted to the anode of the light-emitting element L1 through the turned-on third transistor T3 to reset the light-emitting element L1.

That is, in the embodiments of the present disclosure, the anode of the light-emitting element L1 and the threshold voltage Vth of the driving transistor are reset in the hold frame stage, so that the gate-source voltage difference Vgs of the driving transistor rapidly drops to approximately Vth. Since the fifth transistor T5 included in the compensation sub-circuit 032 is turned off, the potential of the gate of the driving transistor is not affected. Before the light-emitting element L1 returns to emit light, the luminance of the display panel keeps unchanged. In this way, a good low frame rate display can be achieved in a low-frequency refresh state.

Afterwards, when the light-emitting element L1 needs to emit light normally and is turned on again, the potential of the light emission control signal provided by the light emission control terminal EM is set low, and the potential of the scanning signal provided by the scanning signal terminal Scan is set high, so that the second transistor T2 and the third transistor T3 are both turned off, and the sixth transistor T6 and the seventh transistor T7 are both turned on. Further, the second reference power supply signal provided by the second reference power supply terminal Vref2 is transmitted to the first node N1 through the turned-on second transistor T2, so that the potential of the first node N1 returns from the higher potential Vref10 of the first reference power supply signal to the lower potential Vref20 of the second reference power supply signal, and the fourth node N4 is connected to the anode of the light-emitting element L1, thereby reliably driving the light-emitting element L1 to emit light again. In addition, from the hold frame to the stage in which the light-emitting element L1 emits light again, only the potential of the first node N1 jumps and the other devices and capacitors are free of charging and discharging. Therefore, according to the law of conservation of charge, it can be known that after the light-emitting element L1 emits light normally, the potential of the gate of the driving transistor can quickly return to the voltage of normal light emission, which further ensures that the light-emitting element L1 can be reliably driven to emit light.

In summary, the embodiments of the present disclosure provide a method for driving a pixel circuit. In the method, the data writing circuit controls the connection or disconnection between the data terminal and the first node based on the gate driving signal; the reset circuit controls, based on the reset signal and the scanning signal, the connection or disconnection between the initial power supply terminal and the second node and between the initial power supply terminal and the light-emitting element, and the connection or disconnection between the reference power supply terminal and the first node; the potential adjustment circuit controls, based on the compensation signal, the connection or disconnection between the driving power supply terminal and the third node and the connection or disconnection between the second node and the fourth node, and adjusts the potential of the first node, the potential of the second node and the potential of the third node through the coupling effect; the light emission control circuit controls, based on the light emission control signal, the connection or disconnection between the reference power supply terminal and the first node and the connection or disconnection between the fourth node and the light-emitting element; and the drive circuit transmits, based on the potential of the second node and the driving power supply signal, the driving signal to the fourth node to drive the light-emitting element to emit light. In this way, the signal provided by each signal terminal can be flexibly set to achieve a reliable compensation for the threshold voltage of the driving transistor in the drive circuit, thereby ensuring a good display effect.

Additionally, since data is directly written into the second node under the coupling effect of the potential adjustment circuit instead of being written into the second node through the drive circuit, data writing and compensation for the threshold voltage can be achieved through different paths by different circuits, and thus data writing and compensation for the threshold voltage can be separated from each other without affecting each other, which ensures the effective compensation for the threshold voltage, and further ensures a better display effect. Moreover, on the basis of flexibly setting the reference power supply signals provided by the first reference power supply terminal and the second reference power supply terminal, the reference power supply signal at a higher potential can be written into the gate of the driving transistor in the drive circuit in the hold frame, thereby ensuring that the driving transistor is reset reliably in an off state, and ensuring a good display stability, especially at the low frame rate.

Figure 11:
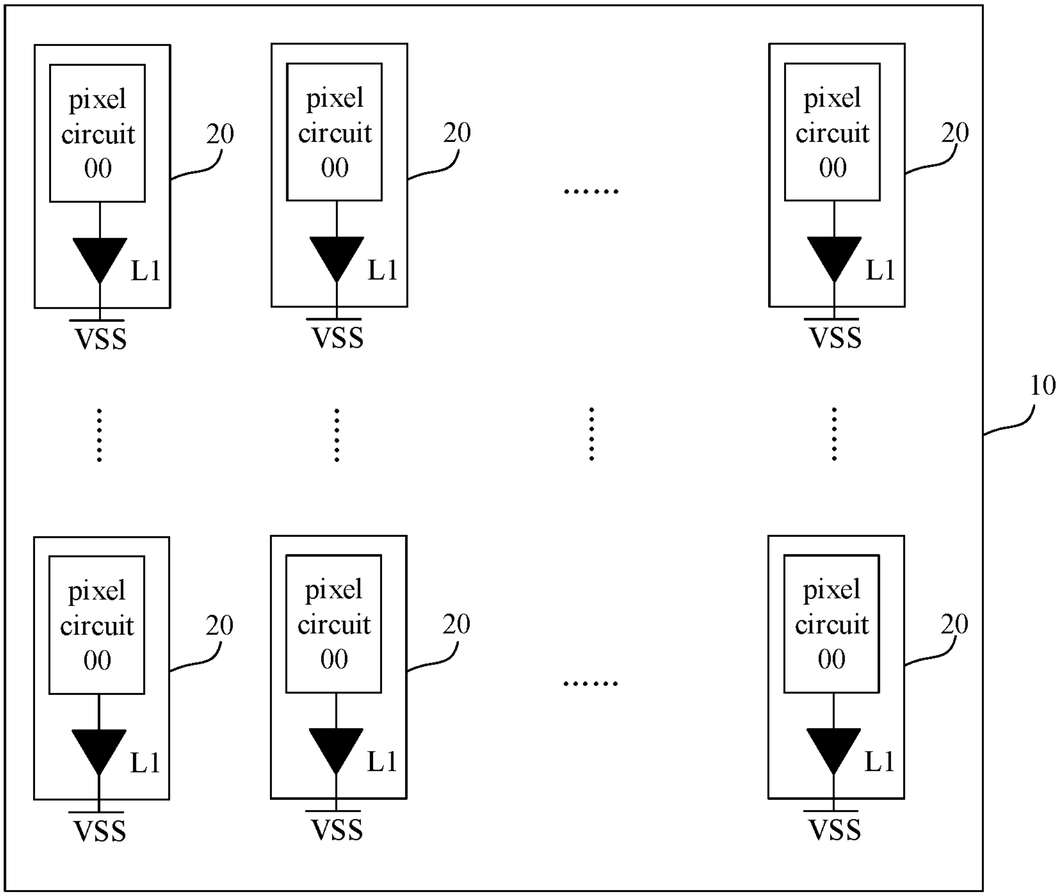
FIG. 11 is a schematic structural diagram of a display panel according to some embodiments of the present disclosure.

FIG. 11 is a schematic structural diagram of a display panel according to some embodiments of the present disclosure. As shown in FIG. 11, the display panel includes a substrate 10 and a plurality of pixels 20 disposed on a side of the substrate 10.

The pixel 20 includes a light-emitting element L1 and the pixel circuit 00 as shown in any one of FIG. 1 to FIG. 7. The pixel circuit 00 is coupled to the light-emitting element L1 and configured to drive the light-emitting element L1 to emit light.

Figure 12:
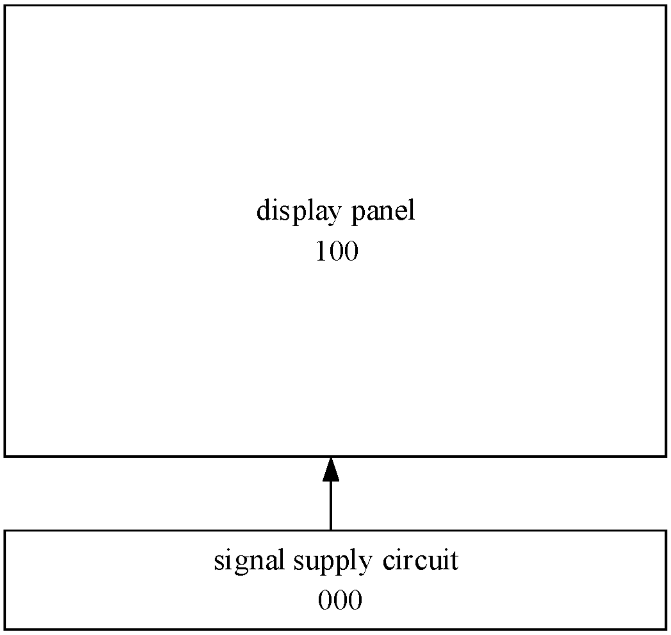
FIG. 12 is a schematic structural diagram of a display device according to some embodiments of the present disclosure.

FIG. 12 is a schematic structural diagram of a display device according to some embodiments of the present disclosure. As shown in FIG. 12, the display device includes a signal supply circuit 000 and the display panel 100 as shown in FIG. 11.

With reference to FIG. 11, the signal supply circuit 000 is coupled to a plurality of signal terminals coupled to the pixel circuits 00 in the display panel 100, and is configured to supply signals to the plurality of signal terminals so as to control the pixel circuits 00 to drive the coupled light-emitting elements L1 to emit light. Optionally, as described in the foregoing embodiments, the plurality of signal terminals herein include the gate signal terminal Sn, the scanning signal terminal Scan, the light emission control terminal EM, the first compensation terminal AZ1, the second compensation terminal AZ2, and the reset terminal Re. Taking the gate signal terminal Sn as an example, the signal supply circuit 000 supplying a gate driving signal to the gate signal terminal Sn is a gate drive circuit.

Optionally, the display device described in the embodiments of the present disclosure may be any product or component having a display function, such as an OLED display device, a mobile phone, a tablet computer, a flexible display device, a television, and a display.

It should be noted that the terms used in the embodiments of the present disclosure are merely used for explaining the embodiments of the present disclosure, but not intended to limit the present disclosure. Unless otherwise defined, the technical terms or scientific terms used in embodiments of the present disclosure should have the ordinary meaning understood by those of ordinary skill in the art to which the present disclosure belongs.

For example, in embodiments of the present disclosure, the terms "first" and "second" are merely used for descriptive purposes, but not construed as indicating or implying any relative importance. The term "a plurality of" refers to two or more unless specifically defined otherwise.

Similarly, "a/an", "one" and similar words do not limit the quantity, but indicate the presence of at least one.

"comprising", "including" and similar words mean that the element or object appearing before "comprising" and "including" encompasses the elements, objects and equivalents thereof appearing after "comprising" and "including", without excluding other elements or objects.

"On," "under," "left," and "right" are merely used to express the relative positional relationships, and when the absolute position of a described object changes, the relative positional relationship may also change accordingly.

The above descriptions are merely optional embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A pixel circuit, comprising:

a data writing circuit, coupled to a gate signal terminal, a data terminal and a first node, and configured to control connection or disconnection between the data terminal and the first node based on a gate driving signal provided by the gate signal terminal;

a reset circuit, coupled to a reset signal terminal, a scanning signal terminal, a first reference power supply terminal, a first initial power supply terminal, a second initial power supply terminal, the first node, a second node and a light-emitting element, and configured to control connection or disconnection between the first initial power supply terminal and the second node based on a reset signal provided by the reset signal terminal, and control connection or disconnection between the first reference power supply terminal and the first node and connection or disconnection between the second initial power supply terminal and the light-emitting element based on a scanning signal provided by the scanning signal terminal;

a potential adjustment circuit, coupled to a first compensation terminal, a second compensation terminal, a driving power supply terminal, the first node, the second node, a third node and a fourth node, and configured to control connection or disconnection between the driving power supply terminal and the third node based on a first compensation signal provided by the first compensation terminal, control connection or disconnection between the second node and the fourth node based on a second compensation signal provided by the second compensation terminal, and adjust a potential of the first node, a potential of the second node and a potential of the third node through a coupling effect;

a light emission control circuit, coupled to a light emission control terminal, a second reference power supply terminal, the first node, the fourth node and the light-emitting element, and configured to control connection or disconnection between the second reference power supply terminal and the first node and connection or disconnection between the fourth node and the light-emitting element based on a light emission control signal provided by the light emission control terminal, wherein a potential of a second reference power supply signal provided by the second reference power supply terminal is lower than a potential of a first reference power supply signal provided by the first reference power supply terminal; and a drive circuit, coupled to the second node, the driving power supply terminal and the fourth node, and configured to transmit a driving signal to the fourth node based on the potential of the second node and the driving power supply signal.

2. The pixel circuit according to claim 1, wherein the reset circuit comprises:

a first reset sub-circuit, coupled to the reset signal terminal, the first initial power supply terminal and the second node, and configured to control the connection or disconnection between the first initial power supply terminal and the second node based on the reset signal;

a second reset sub-circuit, coupled to the scanning signal terminal, the first reference power supply terminal and the first node, and configured to control the connection or disconnection between the first reference power supply terminal and the first node based on the scanning signal; and a third reset sub-circuit, coupled to the scanning signal terminal, the second initial power supply terminal and the light-emitting element, and configured to control the connection or disconnection between the second initial power supply terminal and the light-emitting element based on the scanning signal.

3. The pixel circuit according to claim 2, wherein the first reset sub-circuit comprises: a first transistor; the second reset sub-circuit comprises: a second transistor; and the third reset sub-circuit comprises: a third transistor; wherein a gate of the first transistor is coupled to the reset signal terminal, a first electrode of the first transistor is coupled to the first initial power supply terminal, and a second electrode of the first transistor is coupled to the second node;

a gate of the second transistor is coupled to the scanning signal terminal, a first electrode of the second transistor is coupled to the first reference power supply terminal, and a second electrode of the second transistor is coupled to the first node; and a gate of the third transistor is coupled to the scanning signal terminal, a first electrode of the third transistor is coupled to the second initial power supply terminal, and a second electrode of the third transistor is coupled to the light-emitting element.

4. The pixel circuit according to claim 1, wherein the potential adjustment circuit comprises:

a switching sub-circuit, coupled to the first compensation terminal, the driving power supply terminal and the third node, and configured to control the connection or disconnection between the driving power supply terminal and the third node based on the first compensation signal;

a compensation sub-circuit, coupled to the second compensation terminal, the second node and the fourth node, and configured to control the connection or disconnection between the second node and the fourth node based on the second compensation signal; and an adjustment sub-circuit, coupled to the first node, the second node and the third node, and configured to adjust the potential of the first node, the potential of the second node and the potential of the third node through the coupling effect.

5. The pixel circuit according to claim 4, wherein the switching sub-circuit comprises: a fourth transistor; the compensation sub-circuit comprises: a fifth transistor; and the adjustment sub-circuit comprises: a first capacitor and a second capacitor; wherein a gate of the fourth transistor is coupled to the first compensation terminal, a first electrode of the fourth transistor is coupled to the driving power supply terminal, and a second electrode of the fourth transistor is coupled to the third node;

a gate of the fifth transistor is coupled to the second compensation terminal, a first electrode of the fifth transistor is coupled to the fourth node, and a second electrode of the fifth transistor is coupled to the second node;

the first capacitor is connected in series between the first node and the third node; and the second capacitor is connected in series between the third node and the second node.

6. The pixel circuit according to claim 1, wherein the light emission control circuit comprises:

a first light emission control sub-circuit, coupled to the light emission control terminal, the second reference power supply terminal and the first node, and configured to control the connection or disconnection between the second reference power supply terminal and the first node based on the light emission control signal; and a second light emission control sub-circuit, coupled to the light emission control terminal, the fourth node and the light-emitting element, and configured to control the connection or disconnection between the fourth node and the light-emitting element based on the light emission control signal.

7. The pixel circuit according to claim 6, wherein the first light emission control sub-circuit comprises: a sixth transistor; and the second light emission control sub-circuit comprises: a seventh transistor; wherein a gate of the sixth transistor is coupled to the light emission control terminal, a first electrode of the sixth transistor is coupled to the second reference power supply terminal, and a second electrode of the sixth transistor is coupled to the first node; and a gate of the seventh transistor is coupled to the light emission control terminal, a first electrode of the seventh transistor is coupled to the fourth node, and a second electrode of the seventh transistor is coupled to the light-emitting element.

8. The pixel circuit according to claim 1, further comprising:

an anti-leakage circuit, coupled to the first compensation terminal, the second node and a fifth node, and configured to control connection or disconnection between the second node and the fifth node based on the first compensation signal;

wherein the potential adjustment circuit is further coupled to the fifth node, and the drive circuit is coupled to the second node through the fifth node.

9. The pixel circuit according to claim 8, wherein the anti-leakage circuit comprises: an eighth transistor; wherein a gate of the eighth transistor is coupled to the first compensation terminal, a first electrode of the eighth transistor is coupled to the fifth node, and a second electrode of the eighth transistor is coupled to the second node.

10. The pixel circuit according to claim 8, wherein a material of a transistor controlling the connection or disconnection between the first initial power supply terminal and the second node in the reset circuit and a material of a transistor controlling the connection or disconnection between the fourth node and the second node in the potential adjustment circuit both comprise: a low temperature polysilicon material; and a material of a transistor in the anti-leakage circuit comprises: an oxide material.

11. The pixel circuit according to claim 1, wherein the data writing circuit comprises: a ninth transistor; and the drive circuit comprises: a tenth transistor; wherein a gate of the ninth transistor is coupled to the gate signal terminal, a first electrode of the ninth transistor is coupled to the data terminal, and a second electrode of the ninth transistor is coupled to the first node; and a gate of the tenth transistor is coupled to the second node, a first electrode of the tenth transistor is coupled to the driving power supply terminal, and a second electrode of the tenth transistor is coupled to the fourth node.

12. A method for driving a pixel circuit, applicable to the pixel circuit according to claim 1, the method comprising:

in a first stage, controlling a first initial power supply terminal to be connected to a second node by a reset circuit based on a reset signal provided by a reset signal terminal, controlling a first reference power supply terminal to be connected to a first node and controlling a second initial power supply terminal to be connected to a light-emitting element by the reset circuit based on a scanning signal provided by a scanning signal terminal, and controlling a driving power supply terminal to be connected to a third node by a potential adjustment circuit based on a first compensation signal provided by a first compensation terminal;

in a second stage, controlling the first reference power supply terminal to be connected to the first node and controlling the second initial power supply terminal to be connected to the light-emitting element by the reset circuit based on the scanning signal, controlling the driving power supply terminal to be connected to the third node by the potential adjustment circuit based on the first compensation signal, and controlling the second node to be connected to a fourth node by the potential adjustment circuit based on a second compensation signal provided by a second compensation terminal;

in a third stage, controlling a data terminal to be connected to the first node by a data writing circuit based on a gate driving signal provided by a gate signal terminal, controlling the driving power supply terminal to be connected to the third node by the potential adjustment circuit based on the first compensation signal, and controlling the second node to be connected to the fourth node by the potential adjustment circuit based on the second compensation signal;

in a fourth stage, controlling a second reference power supply terminal to be connected to the first node and controlling the fourth node to be connected to the light-emitting element by a light emission control circuit based on a light emission control signal provided by a light emission control terminal, and transmitting a driving signal to the fourth node by a drive circuit based on a potential of the second node and a driving power supply signal provided by the driving power supply terminal, to drive the light-emitting element to emit light; and in a fifth stage, controlling the first reference power supply terminal to be connected to the first node and controlling the second initial power supply terminal to be connected to the light-emitting element by the reset circuit on based on the scanning signal;

wherein a potential of a second reference power supply signal provided by the second reference power supply terminal is lower than a potential of a first reference power supply signal provided by the first reference power supply terminal; and wherein the first stage, the second stage, the third stage, the fourth stage, and the fifth stage are sequentially executed; and in each stage, the potential adjustment circuit adjusts a potential of the first node, the potential of the second node and a potential of the third node through a coupling effect.

13. The method according to claim 12, wherein the pixel circuit further comprises: an anti-leakage circuit; and the method further comprises: controlling the second node to be connected to a fifth node by the anti-leakage circuit based on the first compensation signal in the first stage to the third stage;

wherein the potential adjustment circuit is further coupled to the fifth node, and the drive circuit is coupled to the second node through the fifth node.

14. A display panel, comprising a substrate, and a plurality of pixels disposed on a side of the substrate; wherein each of the pixels comprises a light-emitting element, and a pixel circuit, wherein the pixel circuit is coupled to the light-emitting element and configured to drive the light-emitting element to emit light, and the pixel circuit comprises:

a data writing circuit, coupled to a gate signal terminal, a data terminal and a first node, and configured to control connection or disconnection between the data terminal and the first node based on a gate driving signal provided by the gate signal terminal;

a reset circuit, coupled to a reset signal terminal, a scanning signal terminal, a first reference power supply terminal, a first initial power supply terminal, a second initial power supply terminal, the first node, a second node and a light-emitting element, and configured to control connection or disconnection between the first initial power supply terminal and the second node based on a reset signal provided by the reset signal terminal, and control connection or disconnection between the first reference power supply terminal and the first node and connection or disconnection between the second initial power supply terminal and the light-emitting element based on a scanning signal provided by the scanning signal terminal;

a potential adjustment circuit, coupled to a first compensation terminal, a second compensation terminal, a driving power supply terminal, the first node, the second node, a third node and a fourth node, and configured to control connection or disconnection between the driving power supply terminal and the third node based on a first compensation signal provided by the first compensation terminal, control connection or disconnection between the second node and the fourth node based on a second compensation signal provided by the second compensation terminal, and adjust a potential of the first node, a potential of the second node and a potential of the third node through a coupling effect;

a light emission control circuit, coupled to a light emission control terminal, a second reference power supply terminal, the first node, the fourth node and the light-emitting element, and configured to control connection or disconnection between the second reference power supply terminal and the first node and connection or disconnection between the fourth node and the light-emitting element based on a light emission control signal provided by the light emission control terminal, wherein a potential of a second reference power supply signal provided by the second reference power supply terminal is lower than a potential of a first reference power supply signal provided by the first reference power supply terminal; and a drive circuit, coupled to the second node, the driving power supply terminal and the fourth node, and configured to transmit a driving signal to the fourth node based on the potential of the second node and the driving power supply signal.

15. The display panel according to claim 14, wherein the reset circuit comprises:

a first reset sub-circuit, coupled to the reset signal terminal, the first initial power supply terminal and the second node, and configured to control the connection or disconnection between the first initial power supply terminal and the second node based on the reset signal;

a second reset sub-circuit, coupled to the scanning signal terminal, the first reference power supply terminal and the first node, and configured to control the connection or disconnection between the first reference power supply terminal and the first node based on the scanning signal; and a third reset sub-circuit, coupled to the scanning signal terminal, the second initial power supply terminal and the light-emitting element, and configured to control the connection or disconnection between the second initial power supply terminal and the light-emitting element based on the scanning signal.

16. The display panel according to claim 15, wherein the first reset sub-circuit comprises: a first transistor; the second reset sub-circuit comprises: a second transistor; and the third reset sub-circuit comprises: a third transistor; wherein a gate of the first transistor is coupled to the reset signal terminal, a first electrode of the first transistor is coupled to the first initial power supply terminal, and a second electrode of the first transistor is coupled to the second node;

a gate of the second transistor is coupled to the scanning signal terminal, a first electrode of the second transistor is coupled to the first reference power supply terminal, and a second electrode of the second transistor is coupled to the first node; and a gate of the third transistor is coupled to the scanning signal terminal, a first electrode of the third transistor is coupled to the second initial power supply terminal, and a second electrode of the third transistor is coupled to the light-emitting element.

17. The display panel according to claim 14, wherein the potential adjustment circuit comprises:

a switching sub-circuit, coupled to the first compensation terminal, the driving power supply terminal and the third node, and configured to control the connection or disconnection between the driving power supply terminal and the third node based on the first compensation signal;

a compensation sub-circuit, coupled to the second compensation terminal, the second node and the fourth node, and configured to control the connection or disconnection between the second node and the fourth node based on the second compensation signal; and an adjustment sub-circuit, coupled to the first node, the second node and the third node, and configured to adjust the potential of the first node, the potential of the second node and the potential of the third node through the coupling effect.

18. The display panel according to claim 17, wherein the switching sub-circuit comprises: a fourth transistor; the compensation sub-circuit comprises: a fifth transistor; and the adjustment sub-circuit comprises: a first capacitor and a second capacitor; wherein a gate of the fourth transistor is coupled to the first compensation terminal, a first electrode of the fourth transistor is coupled to the driving power supply terminal, and a second electrode of the fourth transistor is coupled to the third node;

a gate of the fifth transistor is coupled to the second compensation terminal, a first electrode of the fifth transistor is coupled to the fourth node, and a second electrode of the fifth transistor is coupled to the second node;

the first capacitor is connected in series between the first node and the third node; and the second capacitor is connected in series between the third node and the second node.

19. The display panel according to claim 14, wherein the light emission control circuit comprises:

a first light emission control sub-circuit, coupled to the light emission control terminal, the second reference power supply terminal and the first node, and configured to control the connection or disconnection between the second reference power supply terminal and the first node based on the light emission control signal; and a second light emission control sub-circuit, coupled to the light emission control terminal, the fourth node and the light-emitting element, and configured to control the connection or disconnection between the fourth node and the light-emitting element based on the light emission control signal.

20. A display device, comprising: a signal supply circuit, and a display panel; wherein the signal supply circuit is coupled to a plurality of signal terminals coupled to the pixel circuits in the display panel, and is configured to supply signals to the plurality of signal terminals to control the pixel circuits to drive the coupled light-emitting elements to emit light; and the display panel comprises a substrate, and a plurality of pixels disposed on a side of the substrate; wherein each of the pixels comprises a light-emitting element, and a pixel circuit, wherein the pixel circuit is coupled to the light-emitting element and configured to drive the light-emitting element to emit light, and the pixel circuit comprises:

a data writing circuit, coupled to a gate signal terminal, a data terminal and a first node, and configured to control connection or disconnection between the data terminal and the first node based on a gate driving signal provided by the gate signal terminal;

a reset circuit, coupled to a reset signal terminal, a scanning signal terminal, a first reference power supply terminal, a first initial power supply terminal, a second initial power supply terminal, the first node, a second node and a light-emitting element, and configured to control connection or disconnection between the first initial power supply terminal and the second node based on a reset signal provided by the reset signal terminal, and control connection or disconnection between the first reference power supply terminal and the first node and connection or disconnection between the second initial power supply terminal and the light-emitting element based on a scanning signal provided by the scanning signal terminal;

a potential adjustment circuit, coupled to a first compensation terminal, a second compensation terminal, a driving power supply terminal, the first node, the second node, a third node and a fourth node, and configured to control connection or disconnection between the driving power supply terminal and the third node based on a first compensation signal provided by the first compensation terminal, control connection or disconnection between the second node and the fourth node based on a second compensation signal provided by the second compensation terminal, and adjust a potential of the first node, a potential of the second node and a potential of the third node through a coupling effect;

a light emission control circuit, coupled to a light emission control terminal, a second reference power supply terminal, the first node, the fourth node and the light-emitting element, and configured to control connection or disconnection between the second reference power supply terminal and the first node and connection or disconnection between the fourth node and the light-emitting element based on a light emission control signal provided by the light emission control terminal, wherein a potential of a second reference power supply signal provided by the second reference power supply terminal is lower than a potential of a first reference power supply signal provided by the first reference power supply terminal; and a drive circuit, coupled to the second node, the driving power supply terminal and the fourth node, and configured to transmit a driving signal to the fourth node based on the potential of the second node and the driving power supply signal.

* * * * *